(12) United States Patent
Ashizaki et al.

(10) Patent No.: US 6,683,699 B1
(45) Date of Patent: Jan. 27, 2004

(54) IMAGE PRINTING METHOD AND APPARATUS

(75) Inventors: Koji Ashizaki, Tokyo (JP); Shigeyuki Baba, Tokyo (JP); Akira Shirakura, Tokyo (JP); Nobuhiro Kihara, Kanagawa (JP); Ko Ishimoto, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/404,803

(22) Filed: Sep. 24, 1999

(30) Foreign Application Priority Data

Sep. 28, 1998 (JP) .......................................... P10-273595

(51) Int. Cl.$^7$ .............................................. G06F 15/00
(52) U.S. Cl. ........................ 358/1.18; 358/296; 345/433
(58) Field of Search ................. 358/1.9, 1.14, 358/1.15, 1.16, 1.17, 1.18, 296, 298; 345/433, 419, 426, 427

(56) References Cited

U.S. PATENT DOCUMENTS 5,696,596 A * 12/1997 Taniguchi .................... 358/296

* cited by examiner

*Primary Examiner*—Mark Wallerson
(74) *Attorney, Agent, or Firm*—Radar, Fishman & Grauer PLLC; Ronald P. Kananen

(57) ABSTRACT

The printed matter for regenerating a three-dimensional image derived from a parallax image string obtained on interpolating shape changes between images constituting the parallax image string is to be produced. An image printing device 1 morphs images constituting a plurality of sets of parallax image strings of an object obtained on photographing by an image pickup device 30. Based on the morphed parallax image string, the printed matter regenerating a three-dimensional image is formulated by the printer 50. The image printing device 1 executes processing in which the morphing rate of change is changed depending on the actuation of the actuating unit 100 to display the resulting image on the display unit 40. The image printing device 1 also morphs the image of the object photographed by the image pickup device 30 with an image stored in the external memory 80.

22 Claims, 22 Drawing Sheets

 
FIG.4A  FIG.4B
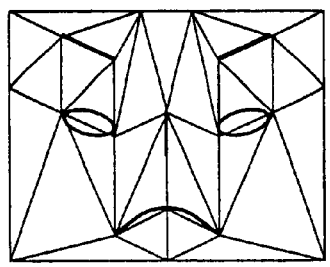 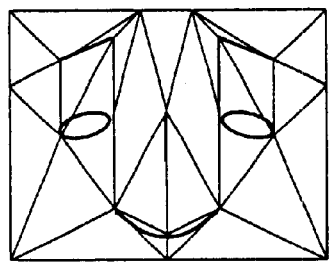
FIG.5A  FIG.5C
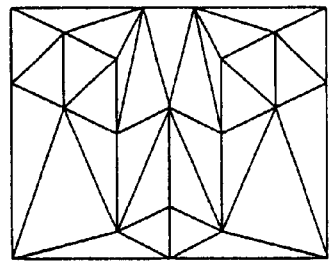 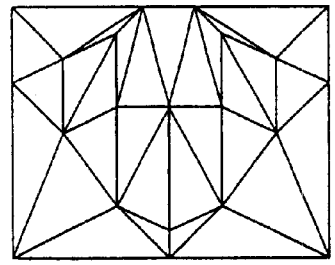
FIG.5B  FIG.5D

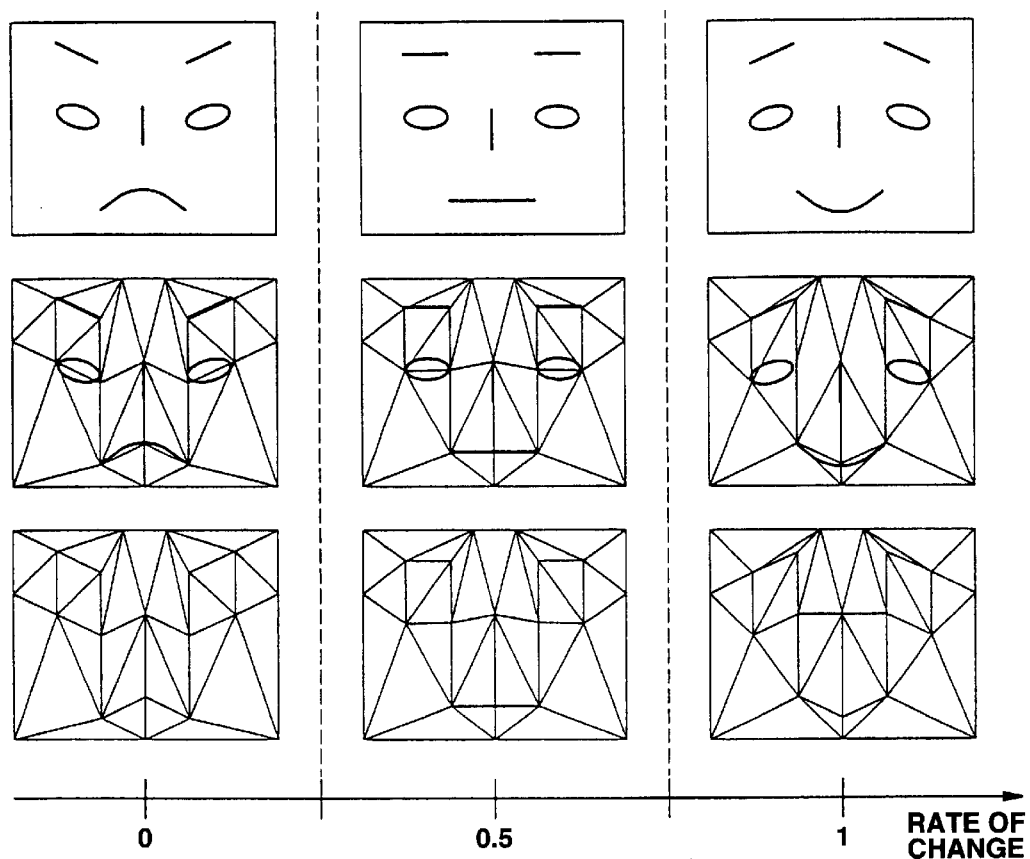
FIG.6A  FIG.6B  FIG.6C

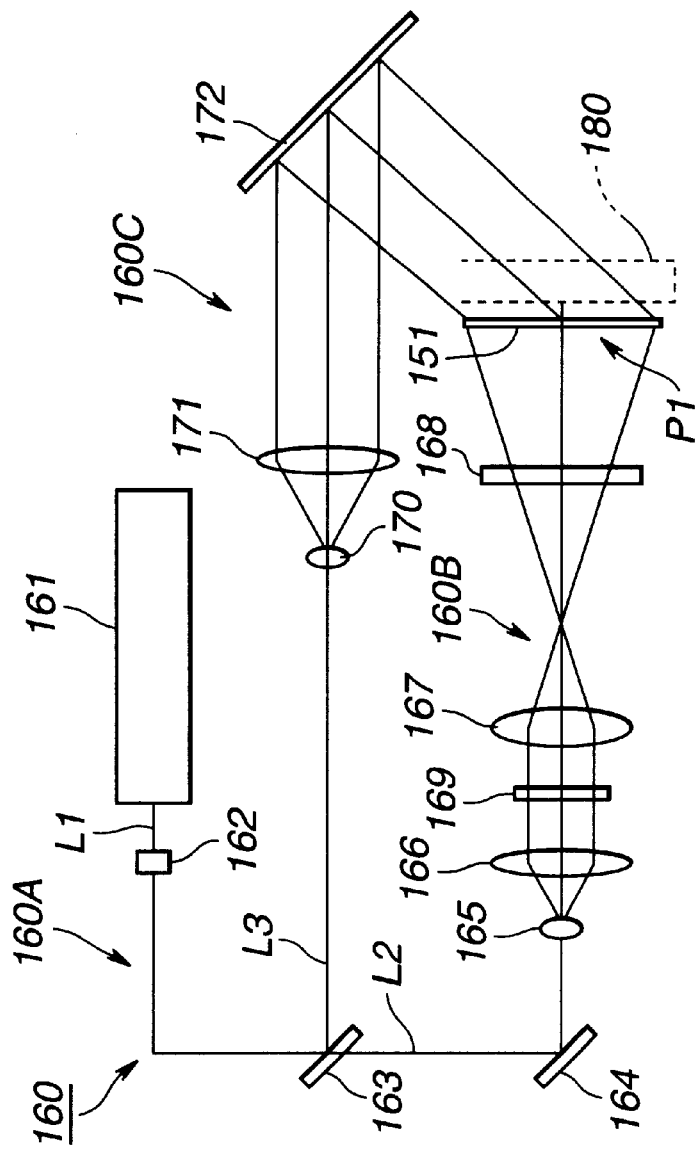
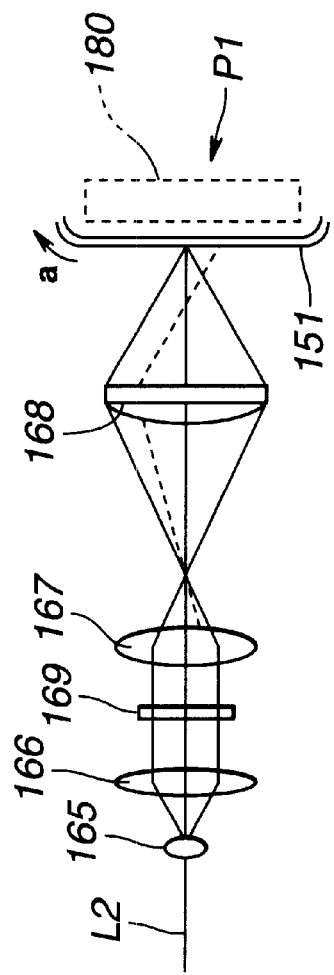
FIG.15A
FIG.15B

IMAGED
OBJECT

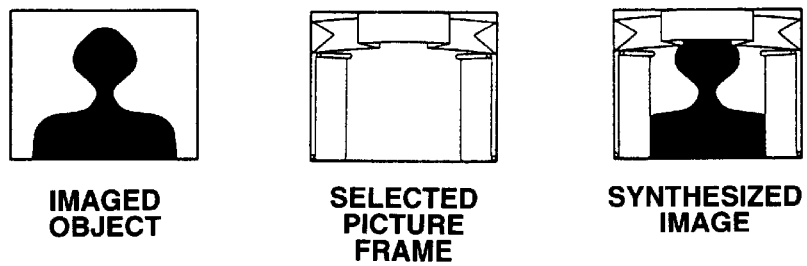
FIG.20
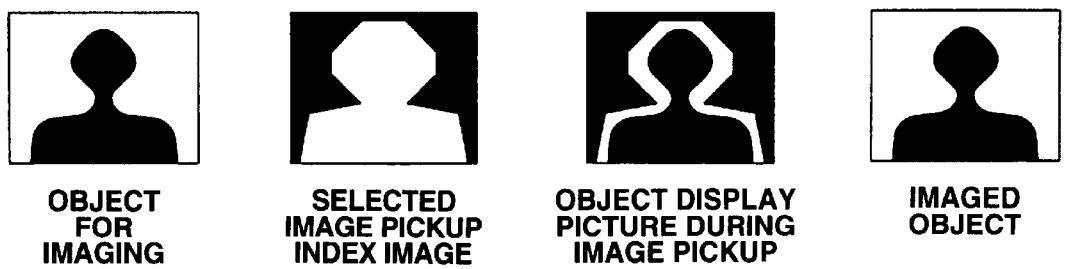
FIG.21
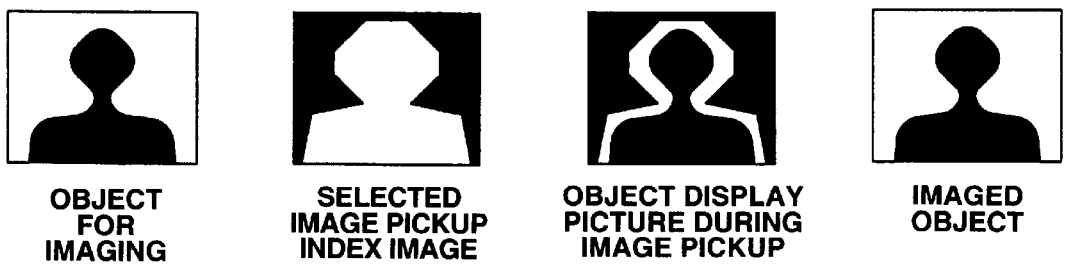
FIG.22

IMAGE PRINTING METHOD AND APPARATUS

BACKGROUND OF THE INVENTION

1. Field of the Invention

This invention relates to a method and apparatus for recording plural parallax images on a recording medium for reproducing a three-dimensional image. More particularly, it relates to a method and apparatus for interpolating shape changes between parallax images for recording.

2. Description of the Related Art

Among image printing devices, there is an image printing device 300 in which the two-dimensional image information obtained on synthesizing the image information of an imaged object with the letter or figure information is viewed on a monitor and in which the two-dimensional image information when the desired composition has been set is printed on a support. This image printing device is exemplified by an image print supplying device described in, for example, the registered Japanese Utility Model 3014733.

Such image printing device is configured as shown for example in FIG. 1, and includes, within the inside of a casing 306, an image pickup device 301, a printer 302 for recording and printing an image photographed by the image pickup device, a display device 304 for displaying an image photographed by the image pickup device 301 via a half-mirror 303, and a memory 305 for storing the information such a as title to be synthesized to the image formed by the image pickup device 301.

With the image printing device 300, a two-dimensional image of an object, photographed by the image pickup device 301, can be printed on a sole sheet as a sole seal or as plural seals divided into, for example, 16 sheets of the same picture pattern.

Meanwhile, the above-described conventional image printing device 300 has a drawback that, since the two-dimensional images, photographed once or in succession by the image pickup device 301, are directly printed by the printer 302, output seals are of the same picture patterns, thus lowering the amusement affording properties.

In the conventional image printing devices 300, images are photographed in succession a plural number of times by the image pickup device 301 to produce plural two-dimensional images of different picture patterns. However, these images suffer from limited correlation among the different images, such that these images, if arrayed chronologically, are not satisfactory in the amusement affording properties.

Moreover, in the conventional image printing device 300, output images are projected on the display device 304 during the time when a user is kept waiting until completion of printing, such that the user is able to anticipate the finished state of the seal. However, since the displayed image is the same still image, sufficient amusement affording properties cannot be provided for the user during the printing time when the user is kept waiting until completion of printing.

Moreover, the conventional image printing device 300 is configured for printing the two-dimensional image as the two-dimensional information on a seal or the like. However, there lacks such a device that is able to record the three-dimensional information as a user-friendly system, such as the above-described image printing device 300.

SUMMARY OF THE INVENTION

It is therefore an object of the present invention to provide an image printing method and apparatus having higher amusement affording properties in which the problem in the conventional method and apparatus possibly detracting from the amusement affording properties is overcome.

In one aspect, the present invention provides an image printing device for formulating the printer matter regenerating a three-dimensional image from a parallax image string made up of a plurality of parallax images having grasped an object from a plurality of viewing points, wherein the device includes interpolation means for interpolating shape changes between images making up a plurality of sets of parallax image strings to generate a plurality of interpolated images to generate an interpolated parallax image string including these interpolated images, the interpolated parallax image string having the parallax information, and wherein the device further includes printing means for recording respective images making up the interpolated parallax image string generated by the interpolation means on a recording medium for formulating the printed matter reproducing a three-dimensional image.

With the image printing device, according to the present invention, the shape changes between images making up plural sets of the parallax image strings are interpolated to produce the printed matter which regenerates a three-dimensional image derived from the produced interpolated parallax image string.

Also, with the present image printing device, the imaging from respectively different plural viewing points of the object is repeated a number of times to formulate the printed matter which regenerates the three-dimensional image derived from the produced interpolated parallax image string.

With the present image printing device, the object is imaged a plurality of numbers of times to generate plural sets of the parallax image strings and shape changes between images making up the parallax image strings are interpolated.

The image printing device according to the present invention also includes inputting means for inputting the information necessary for interpolation by the interpolation means, and display means for displaying an image. The inputting means is capable of inputting analog quantities, while the interpolation means is capable of generating a plurality of sets of parallax image strings the degree of interpolation of which has been changed. The display means demonstrates interpolated images obtained on changing the degree of interpolation of shape changes between the images making up the parallax image string responsive to the input information from the inputting means.

With the present image printing device, an interpolated image, the degree of interpolation of which is changed in dependence upon the input information, can be displayed.

The image printing device further includes imaging mans for imaging an object, and storage means having stored therein a parallax image string. The interpolating means uses, as the plural sets of the parallax image strings from which the interpolated parallax image string is to be derived, a parallax image string made up of a plurality of parallax images, obtained on imaging the object from a plurality of different viewing points by the image pickup means, and a parallax image string stored in the storage means.

With the present image printing device, shape changes can be interpolated not only for the parallax image string obtained on imaging the object, but also for the stored parallax image string.

The image printing device also includes storage means for storing an image; and synthesizing means for synthesizing a parallax image string made up of plural parallax images having imaged the object from plural viewing points and an image stored in the storage means to generate a synthesized parallax image string. The interpolation means employs, as at least one of the plural sets of the parallax image strings, from which is derived the interpolated parallax image string, the synthesized parallax image string generated by the synthesizing means.

With the present image printing device, the printed matter is formulated which reproduces a three-dimensional image based on a synthesized parallax image string obtained on synthesizing the imaged parallax image string and the stored parallax image string.

The present image printing device further includes image pickup means for imaging an object, and display means for displaying an image. At least one of the parallax image strings to be interpolated by the interpolating means is a parallax image string made up of a plurality of parallax images obtained on imaging the object by the image pickup means from respectively different plural viewing points. The displaying means demonstrates a photographing index image for guiding the object to its proper position prior to imaging of the object by the image pickup means.

With the present image printing device, in which the photographing index image is displayed, it is possible to match the object position between images or the object size on each image.

In another aspect, the present invention provides an image printing method for formulating the printer matter regenerating a three-dimensional image from a parallax image string made up of a plurality of parallax images having grasped an object from a plurality of viewing points, wherein the method includes interpolating shape changes between images making up a plurality of sets of parallax image strings to generate a plurality of interpolated images, generating an interpolated parallax image string carrying the parallax information and including these interpolated images, and recording respective images making up the interpolated parallax image string on a recording medium for formulating the printed matter reproducing a three-dimensional image.

With the present image printing method, shape changes between images constituting the plural sets of the parallax image strings are interpolated to prepare the printed matter regenerating a three-dimensional image based on the produced interpolated parallax image string.

The present image printing method further includes imaging the object a plurality of number of times from respectively different viewing points of the object to generate a plurality of sets of the parallax image strings each of which is made up of a plurality of parallax images having imaged the object from respectively different viewing points.

With the present image printing method, the object is imaged plural numbers of times and shape changes between images making up plural sets of the parallax image strings are interpolated.

The present image printing method also includes generating a plurality of sets of interpolated parallax image strings, the degree of interpolation of which has been changed, and displaying interpolated images obtained on changing the degree of interpolation of shape changes between images making up the parallax image string responsive to the information inputted from outside.

With the present image printing method, the interpolated image, the degree of interpolation of which is changed responsive to the externally inputted information, can be demonstrated on the display means.

The present image printing method also includes using, as the plural sets of the interpolated parallax image strings, from which the interpolated parallax image string is derived, a parallax image string made up of a plurality of parallax images obtained on photographing the object from respectively different plural viewing points and a parallax image string stored in the storage means.

With the present image printing method, not only shape changes of the parallax image strings obtained on imaging the object, but also those of the parallax image strings obtained on imaging the object and the parallax image string stored in the storage means are interpolated.

With the image printing method according to the present invention, a parallax image string comprised of a plurality of parallax images having grasped the object from a plurality of viewing points to an image stored in the storage means are synthesized to generate a synthesized parallax image string and the synthesized parallax image string is used as at least one of the plural sets of the parallax image strings from which the interpolated parallax image string is derived.

With the present image printing method, the printed matter is produced which regenerates a three-dimensional image derived from the synthesized parallax image string obtained on synthesizing the parallax image string obtained on photographing and an image stored in the storage means.

In the present image printing method, at least one of the parallax image strings for interpolation is a parallax image string made up of a plurality of parallax images obtained on imaging the object from respectively different plural viewing points and a photographing index image for guiding the object to its proper position is demonstrated on the display means prior to imaging the object.

With the present image printing method according to the present invention, the photographing index image is displayed on display means to match the size of the object presented in each image.

With the image printing device of the present invention, the printed matter regenerating a three-dimensional image based on the produced interpolated parallax image string can be formulated by interpolating shape changes between images constituting plural sets of the parallax image strings. Thus, the image printing device according to the present invention can produce the printed matter having high amusement offering properties.

With the image printing device according to the present invention, the object is imaged a plurality of numbers of times to interpolate shape changes between images constituting the resulting plural sets of the parallax image strings. Thus, the present image printing device can offer high amusement affording properties to the user. If plural users are imaged simultaneously, amusement can be offered to each user.

Also, with the image printing device according to the present invention, the interpolated object is displayed in which the degree of interpolation of shape changes between images making up the parallax image string obtained on imaging the object is displayed, thus assuring amusement for the user even during printing.

Moreover, with the image printing device according to the present invention, it is possible to form the printed matter which regenerates a three-dimensional image based on the synthesized parallax image string obtained on synthesizing the photographed parallax image string and the stored image, thus assuring amusement for the user.

In addition, with the image printing device according to the present invention, the object position between the images or the object size presented in each image can be matched by displaying a photographing index image for guiding the object arraying position to permit facilitated characteristic point extraction in the interpolation processing. Since the accuracy in extraction of characteristic points and the speed of the extracting operation are improved, it is possible to obtain an interpolated parallax image string of high image quality. By changing the photographing index image from one imaging operation to another, the movement feeling can be afforded to the image thus assuring high amusement affording properties of the image.

With the image printing method according to the present invention, since the shape changes between images making up a plurality of sets of the parallax image strings can be interpolated to formulate the printed matter regenerating a three-dimensional image based on the produced interpolated parallax image string, the image can be improved in amusement affording properties.

Also, with the image printing method according to the present invention, in which the object is imaged a plurality of number of times, and shape changes between images constituting the plural sets of the parallax image strings are interpolated, high amusement can be afforded to the user, such that, if plural persons are imaged, amusement can be offered to each user.

With the image printing method according to the present invention, not only shape changes between parallax image strings obtained on imaging the object, but also those between the parallax image string obtained on imaging the object and the parallax image string stored in the storage means can be interpolated to eliminate the necessity of imaging the object simultaneously at the same place to improve convenience and amusement for the user. Moreover, since interpolated images can be formulated with a wide variety of images, high amusement offering properties can be assured.

With the image printing method according to the present invention, it is possible to form the printed matter which regenerates a three-dimensional image derived from the synthesis of the parallax image string obtained on photodetector and the image stored in the storage means. Thus, the present image printing method offers high amusement for the user.

Moreover, with the image printing method according to the present invention, in which a photographing index image used for guiding the object arraying position is displayed on the display means to match the object position between images or the object size in each image, characteristic point extraction in the interpolation processing is facilitated to improve the accuracy in the characteristic point extraction to expedite the extraction processing. By changing the photographing index images from one imaging operation to another, there is assured movement feeling in the image produced on interpolation to realize an image having high amusement offering properties.

BRIEF DESCRIPTION OF THE DRAWINGS

FIGS. 4A and 4B show two image strings being processed by morphing.

FIGS. 5A, 5B, 5C and 5D illustrate characteristic points in the morphing.

FIGS. 6A, 6B and 6C illustrate specified examples of morphing and specifically illustrate an original image to be processed with morphing and an image processed with morphing.

FIGS. 15A, 15B are schematic views showing an optical system of a holographic stereogram formulating device as an example of a stereo image printer of the image printing device.

FIG. 20 illustrates an image synthesized by the image printing device.

FIG. 21 illustrates an imaging index image in the image printing device.

FIG. 22 illustrates how the imaging index image is displayed and a synthesized image is displayed in the image printing device.

DESCRIPTION OF THE PREFERRED EMBODIMENTS

Figure 1:
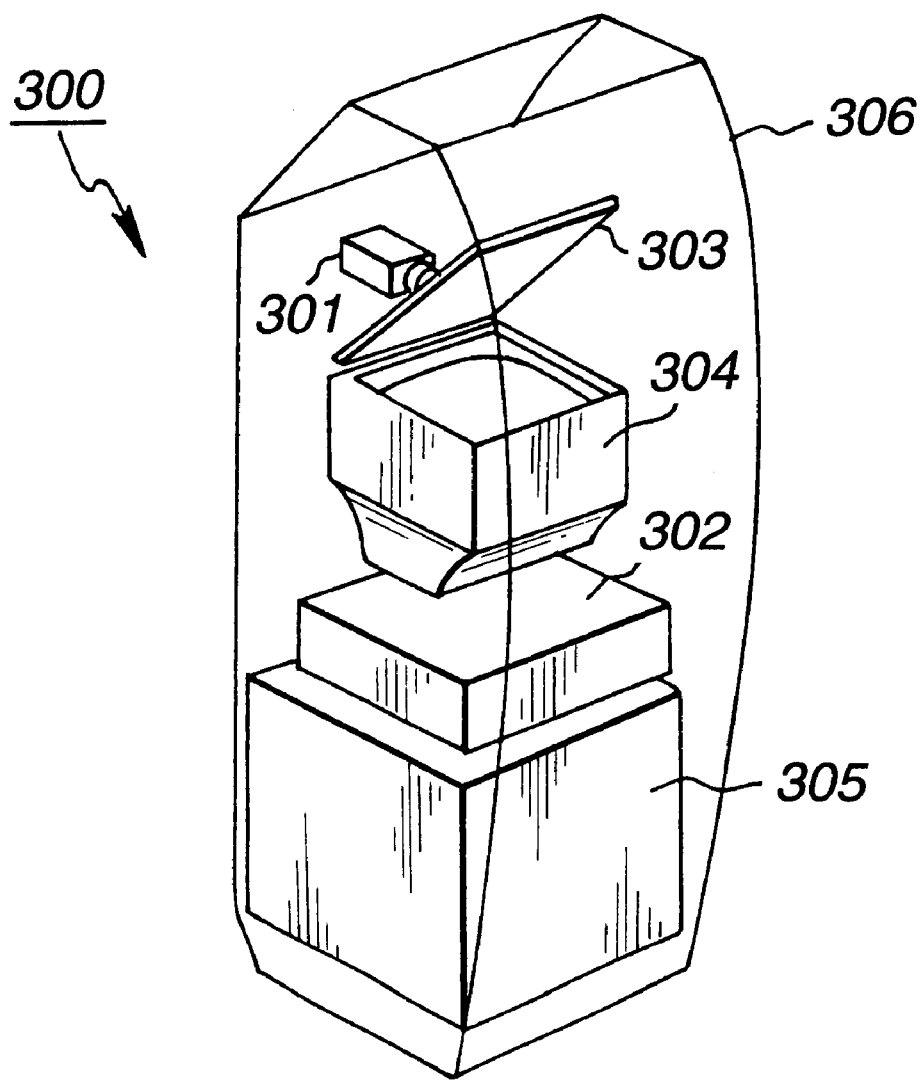
FIG. 1 is a perspective view showing the appearance of a conventional image printing device.

Referring to the drawings, preferred embodiments of the present invention will be explained in detail.

The preferred embodiments of the present invention exploit morphing as one of image processing techniques for interpolating shape changes among plural images. This morphing technique is now explained.

Figure 2A:
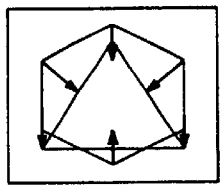
FIGS. 2A and 2B are conceptual views illustrating the morphing technique.
Figure 2B:
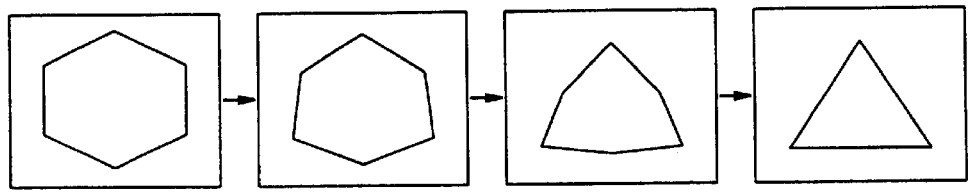

The morphing is a technique of filling in blanks between an image and another image to which the first-stated image is changed, in order to give an appearance as if the images are undergoing gradual transition. That is, when an image representing a hexagon is changed to an image representing a triangle, as shown in FIG. 2A, the shape between the hexagon and the triangle is interpolated to give an appearance as if the shape changes are occurring progressively, as shown in FIG. 6.

Figure 3A:
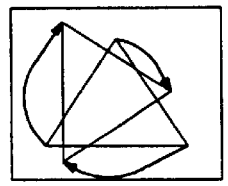
FIGS. 3A and 3B are conceptual views illustrating the tweening technique.
Figure 3B:
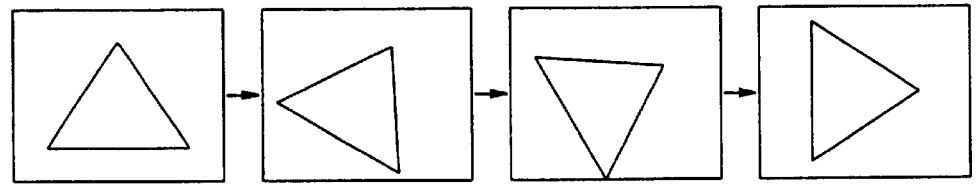
Figure 7:
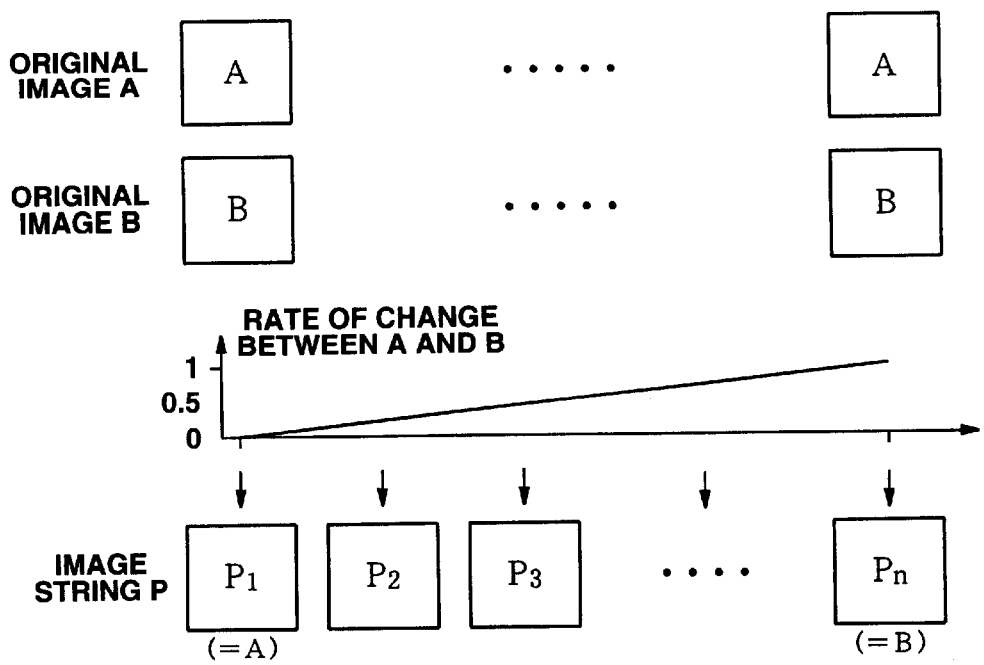
FIG. 7 shows a specified example of morphing and specifically shows how a string of n morphed image images is produced by changing the rate of change of morphing between two original images.

As a technique resembling this morphing, there is a tweening technique, which is a technique in which, when an image is rotated and translated in part or in its entirety to undergo changes, the blanks between changing images are filled to give an appearance as if the image is moving gradually. That is, the tweening is such a technique in which, if a triangle is rotated 90° clockwise, as shown in FIG. 3A, triangles in the course of 90° rotation are interpolated to give an appearance as if the movement occurs gradually. This tweening is occasionally included into the morphing as defined above.

As a more specified illustration of the morphing technique, the morphing technique for two raster images obtained on photographing with a camera is explained.

The morphing processing for two raster images is carried out with the two images being split into plural elementary areas. In this morphing processing, conversion of geometrical figures between corresponding areas by weighted addition, termed warping, and image computations by weighted summing, termed dissolve, are carried out to generate an intermediate image which appears as if the plural images have been fused together.

As an example, the morphing processing from two images is explained with respect to FIGS. 4 to 7.

The morphing processing is carried out on two images shown in FIGS. 4A and 4B. In the morphing processing, corresponding characteristic points are set between the two images to be processed. These characteristic points are used as start and end points of changes in the morphing processing, such as geometrical shape conversion or weighted summation. As the method for displaying data of these characteristic points, there are such a method interconnecting the characteristic points, termed control lines, by a line segment, and such a method representing the data as a area comprised of a polygon, such as a triangle or a quadrangle, generated on interconnecting the characteristic points.

The method for extracting characteristic points from the image being processed may be exemplified by a method in which a user issues commands as he views an image, a method in which pre-fixed control lines or areas are readied, and a method in which the images to be processed are processed to extract characteristic points. The method for doing image processing for extracting characteristic points may be exemplified by a combination of image processing operations on the images being processed, such as differentiation, contour extraction, correlation with templates, Huff transform processing or center of gravity computing processing. If limitations are imposed by assuming that an image being processed is a human face, characteristic points can be extracted with eyebrows, eyes, nose, mouth, ears, hair style or face type as basic elements.

FIG. 5 shows an example in which data of the characteristic points of two images shown in FIG. 4 are represented as images made up of polygons. The characteristic points are shown as plural triangular areas, as shown in FIGS. 5B and 5D. In addition, those points representing the features in the image, such as eyes or a mouth, have been extracted in the images.

In the morphing processing, corresponding characteristic points given to the two images shown in FIG. 5 are taken as start and terminal points and geometrical shape conversion and weighted summation of the image data are executed to yield an image intermediate between the two images. The states of the start and end points of the two images are set as the 0 state and the 1 state in the rate of change and used as weighting in the geometrical shape conversion and in the weighted summation of the image data to set a mixing ratio of two images.

That is, in the morphing processing, in each characteristic point, corresponding to an apex of a triangle, the motion vector between the two images shown in FIGS. 6A and 6C is multiplied by the rate of change to effect weighting for the geometrical shape conversion to yield an intermediate image. In a similar manner, in the morphing processing, an image with the rate of change of 0.5, shown in FIG. 6B, is obtained by performing weighted addition of image data between the two images.

It is thus possible with the morphing processing to generate an intermediate image between the two images.

Also, in the morphing processing, the rate of change may be changed to yield an image string having plural rates of change. For example, if, in the morphing processing of an original image A and an original image B, as two planar images, the rate of change is changed between 0 and 1, an image string P composed of plural images can be produced. It is assumed that the images P1 and Packaging material 2 are those for the rates of change equal to 0 and 1, respectively, and are equivalent to the original images A and B, respectively. By recording the images of the image string P on a recording medium in the manner of formulating a holographic stereogram as later explained, it is possible for a user to view a planar image the morphing of which is changed depending on the viewing direction. If the planar image is viewed from left, the original image A is viewed, with the shape of the image being changed as the viewer shifts his line of sight towards right. If the planar image is viewed from right, the original image B is observed first.

Thus, in the morphing processing, it is possible to produce an image string, comprised of plural intermediate images, from two images.

Figure 8:
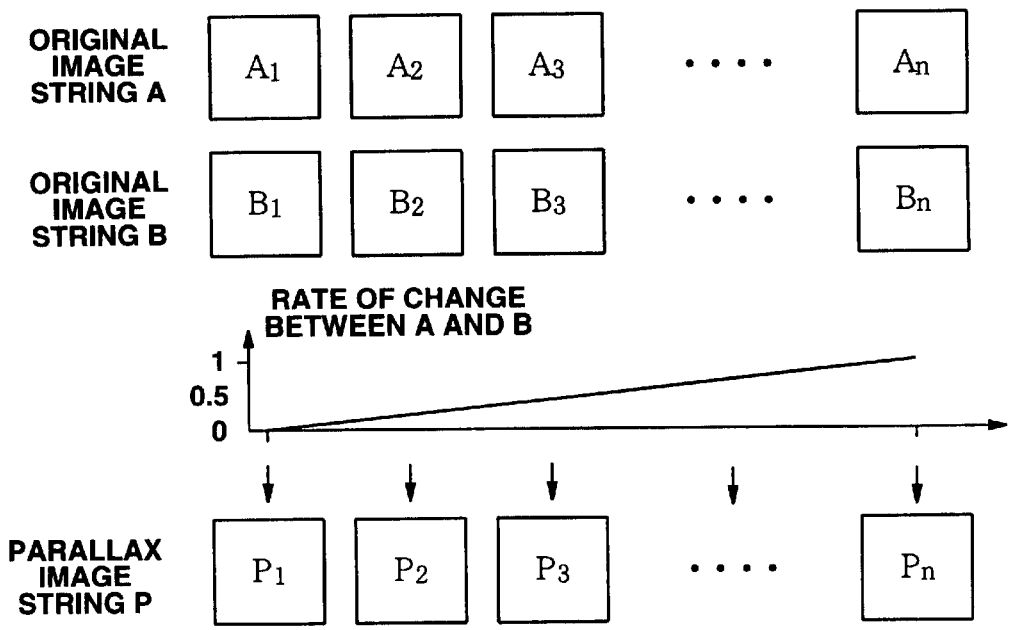
FIG. 8 shows a specified example of morphing and specifically shows how a morphed string of parallax images of n image images is produced by changing the rate of change of morphing between two original image strings each made up of n images.
Figure 9:
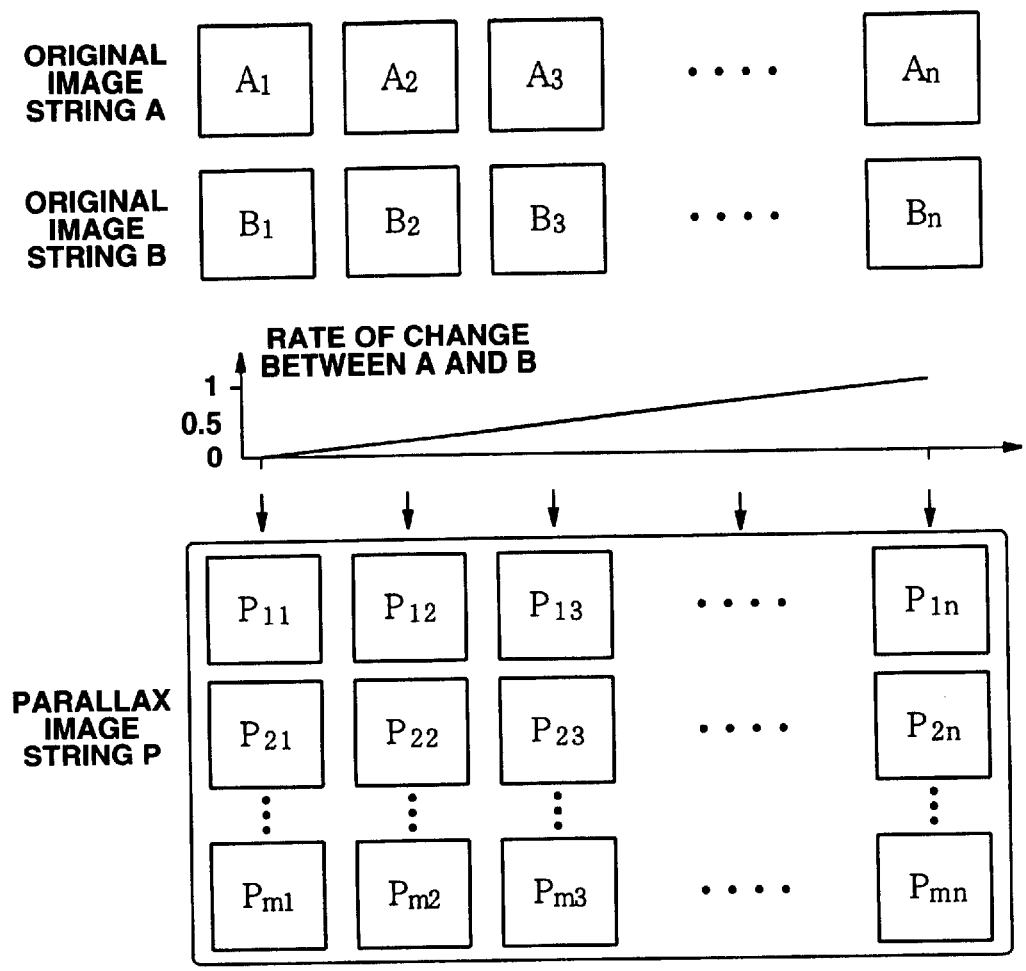
FIG. 9 shows a specified example of morphing and specifically shows how a morphed string of parallax images of m×n image images is produced by changing the rate of change of morphing between two original image strings each made up of n images.
Figure 10:
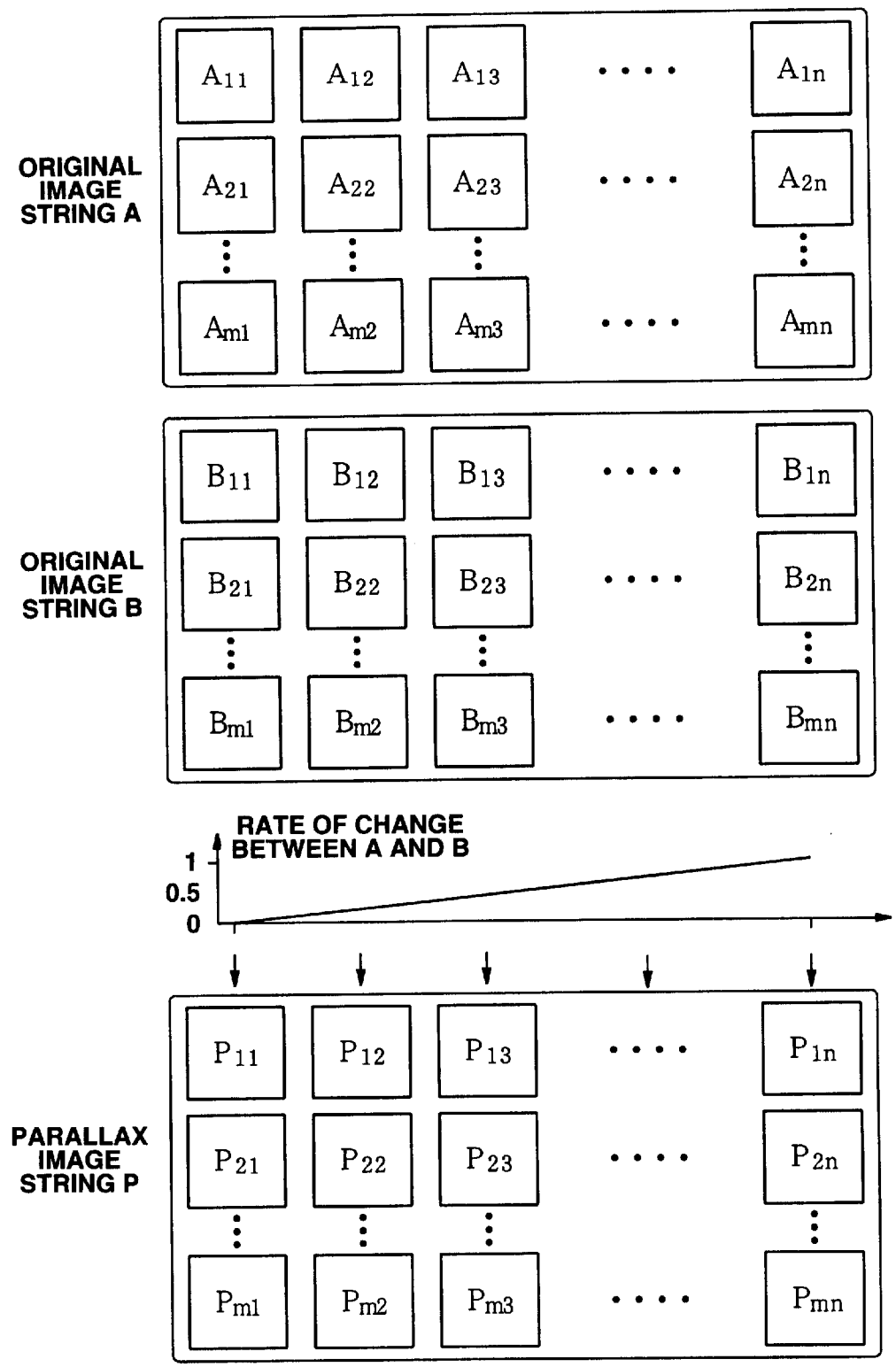
FIG. 10 shows a specified example of morphing and specifically shows how a morphed string of parallax images of m×n image images is produced by changing the rate of change of morphing between two original image strings each made up of m×n images.
Figure 11:
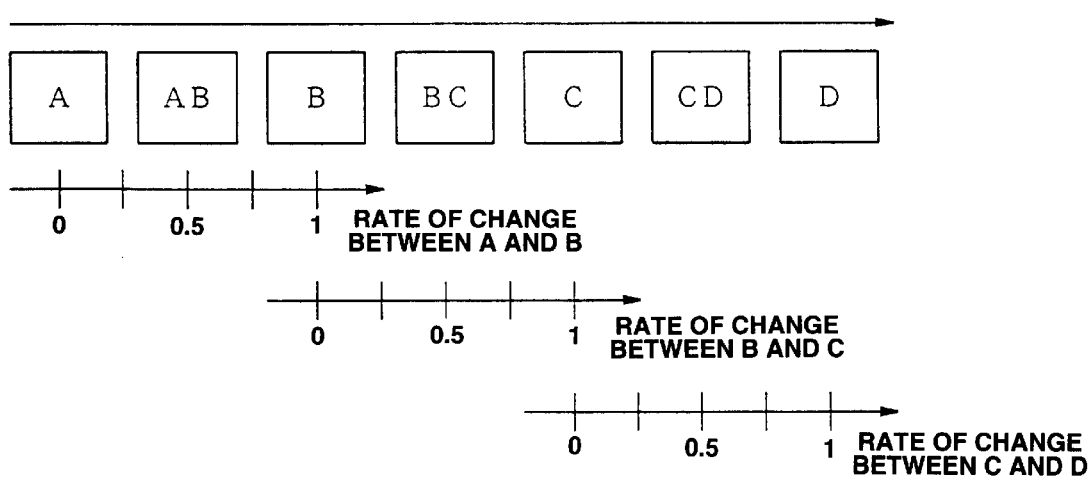
FIG. 11 illustrates morphing processing for three or more images.

Referring to FIGS. 8 to 10, morphing processing for a three-dimensional image is explained. For morphing processing in this case, three sorts of the processing methods may be conceived, depending on the number of the original images constituting an original image string as a parallax image string and the number of the images as processing results.

It is assumed first that there are two sets of original image strings, as shown in FIG. 8. These original image strings A and B are parallax image strings from which a three-dimensional image is to be reproduced, and afford horizontal parallax or vertical parallax. To each pair of the parallax images of the two sets of the original image strings A and B, composed of each n parallax images A1, A2, . . . , An, B1, B2, . . . , Bn, an optional set of the rates of change from 0 to 1 are sequentially allocated to yield a parallax image string P of n parallax images. By regenerating a three-dimensional image based on the parallax image string P, a three-dimensional image, regenerated from the original image string A, is viewed, if the user views from left, whereas, if the user views from right, a three-dimensional image regenerated from the original image string B is viewed. Thus, a three-dimensional image, the morphing of which is changed depending on the viewing direction, can be viewed.

It is then assumed that there are two sets of the original image strings as parallax image strings, these image strings afford horizontal parallax and the vertical parallax and that three-dimensional images regenerated from these strings have both the horizontal parallax and the vertical parallax, as shown in FIG. 9. In this case, the rate of change is changed for each pair of associated images of the two sets of the original image strings to effect morphing to generate a morphed parallax image string P. For example, to each pair of the parallax images of the two sets of the original image strings A and B, each composed of n parallax images A1, A2, . . . , An, B1, B2, . . . , Bn, m optional rates of change from 0 to 1 are allocated to generate the parallax image string P composed of m×n parallax images. By regenerating three-dimensional images based on the parallax image string P, there may be observed a three-dimensional image, the morphing of which is changed depending on the viewing direction, such that, if the viewer shifts his line of sight in the up-and-down direction, a simple three-dimensional image is observed and, if the viewer shifts his line of sight in the up-and-down direction, a three-dimensional image morphed from the original image string A and the original image string B is observed.

As a third processing method, there are two sets of the original image strings, each having both the horizontal parallax and the vertical parallax, and a three-dimensional image regenerated from these two sets of the original image strings can regenerate both the horizontal parallax and the vertical parallax. In this case, as in the above-described two methods, the morphed parallax image string P is produced by executing the morphing as the rate of change is changed for each pair of the images of the two sets of the original image strings. For example, a set of rates of change from 0 to 1 is allocated to each pair of the parallax images of the two sets of the original image strings, composed of m×n parallax images A11, A12, . . . , Amn, B11, B12, . . . , Bmn, in the horizontal direction, vertical direction or the oblique direction, to generate a parallax image string P made up of m×n parallax images. A three-dimensional image is regenerated based on the parallax image string P. In this case, if the parallax image string P is viewed from above left, a three-dimensional image of the original parallax image string A is observed, whereas, if the parallax image string P is viewed from lower right, a three-dimensional image of the original parallax image string B is observed. That is, a three-dimensional image, the morphing direction of which is changed depending on the viewing direction, can be viewed.

By executing the above processing, the shape changes in the three-dimensional image can be interpolated in the morphing processing.

With the morphing processing, an intermediate image can be generated which is continuously changed between three or more images instead of between two images. That is, with the morphing processing, intermediate images AB, BC and CD can be generated which are continuously changed from the four images A, B, C and D. By this continuous morphing processing, an intermediate image is generated by sequentially changing the rate of change of the ordered four images from 0 to 1.

Figure 12:
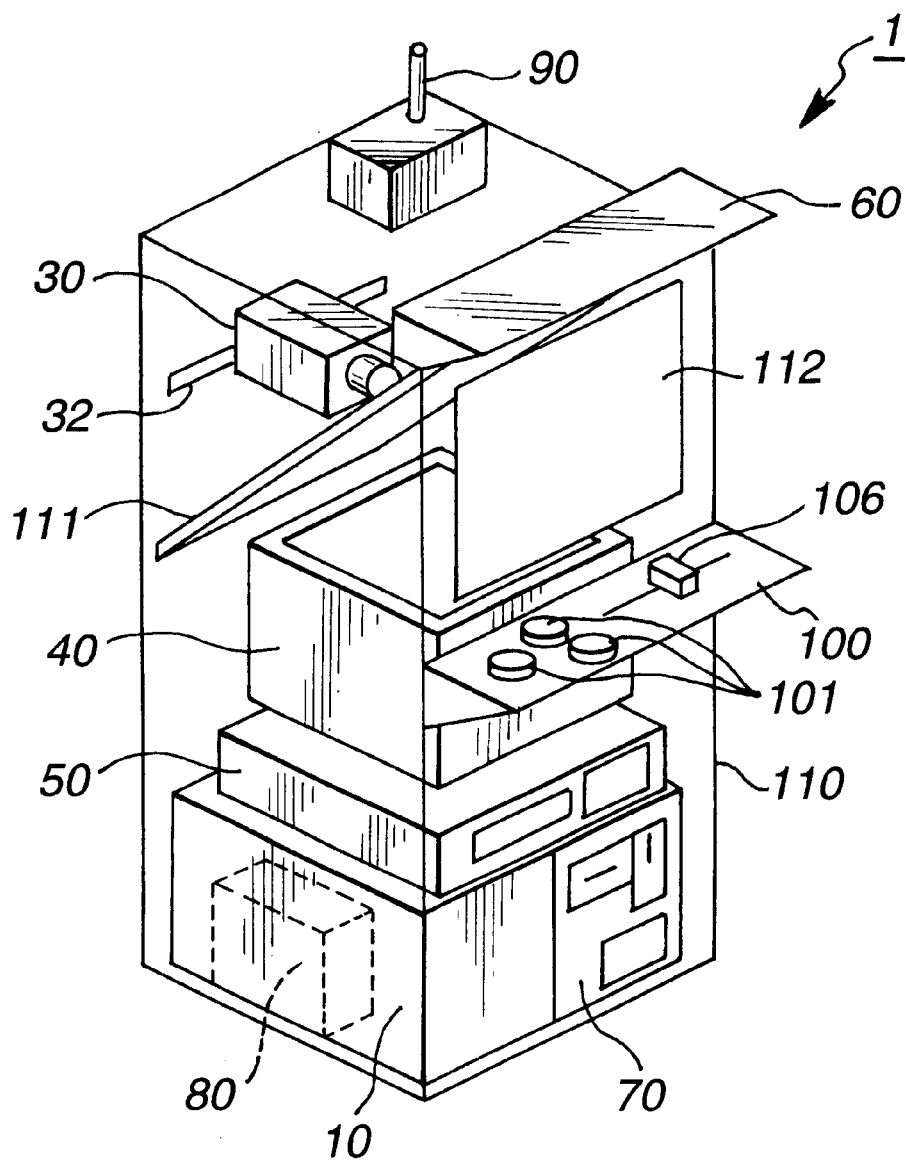
FIG. 12 is a perspective view showing the appearance of an image printing device according to a first embodiment of the present invention.

In the first embodiment, exploiting the above-described morphing technique, the image printing device 1, shown in FIG. 12, includes a controller 10 for controlling the entire device, an image pickup device 30 for imaging an object, a display unit 40 for displaying the image, a printer 50 for recording an image on a recording medium for preparing the printed matter, an illumination unit 60 for illuminating the object, a charge receiving unit 70 for receiving the paid charge, an external memory 80 for storing the image data, a communication unit 90 for having the communication with the external equipment, and an operating unit 100 for operating the device. Of these, the controller 10, image pickup device 30, display unit 40, printer 50 and the charge receiving unit 70 are housed within the casing 110, and the external memory 80 are arranged as a unit with the controller 10.

The controller 10 has a device controller and an image processor, not shown. The device controller inputs/outputs the control signal with other portions of the image printing device 1 to control the image printing device 1 in its entirety. The image processing unit applies synthesis processing and morphing processing to image data obtained on photographing by the image pickup device 30 as later explained, image data held in the storage unit such as a memory provided in the image processing unit or held in the external memory 80 or image data drawn by the drawing procedure, such as the program. If the above-described image data constructs the parallax image string data, the image processing unit performs so-called viewing point conversion processing for converting the image data into image data suited to regeneration of a three-dimensional image from the parallax image string data, as will be explained subsequently. The image processing unit inputs/outputs the image data with the image pickup device 30, display unit 40, printer 50 and the communication unit 90, which will be explained subsequently.

The image pickup device 30 photographs an image of the object facing an imaging window 112 via a display imaging optical system 111 constituted by e.g., a half mirror. This image pickup device 30 includes a parallax imaging system 32, constituted by a feed table adapted for moving a camera or the like, and is capable of photographing the parallax image of the object. The user can see the image displayed on the display unit 40 via the display imaging optical system 111 or directly on the display surface of a CRT monitor 42 provided on the display unit 40 as will be explained subsequently. The display unit 40 also has the function of generating speech signals outputted by the controller 10 as the sound. Thus, in the image printing device 1, the user is able to acquire the information by the sound in addition to the image displayed on the display unit 40.

The printer 50 prints the image, obtained by the image processing unit on viewing point conversion processing of the synthesized, drawn or morphed image, on the recording medium. In the image printing device 1, the user is able to accept the printed matter ejected by the printer 50.

The illumination unit 60 has the function of illuminating the object when required for photographing the image of the object.

The charge receiving unit 70 receives the equivalent paid for using the image printing device 1. This charge receiving unit 70 accepts paper money or coin, or credit coin, such as cash card or credit card, pre-paid card, electronic money via the communication network, to receive the fee or to return change or cards. The charge receiving unit 70 also has the storage function until recovery of the coin.

The external memory 80 is made up of a storage device, such as a hard disc, and has the function of holding the picture data. The external memory 80 stores the image data to be processed or already processed by the image processing unit.

The communication unit 90 inputs/outputs signals with the controller 10 to have communication with the external equipment.

The actuating unit 100 is acted on when employing the image printing device 1 and has a variety of actuating portions.

The image printing device 1, constructed as described above, is explained in detail with reference to FIG. 13.

Figure 13:
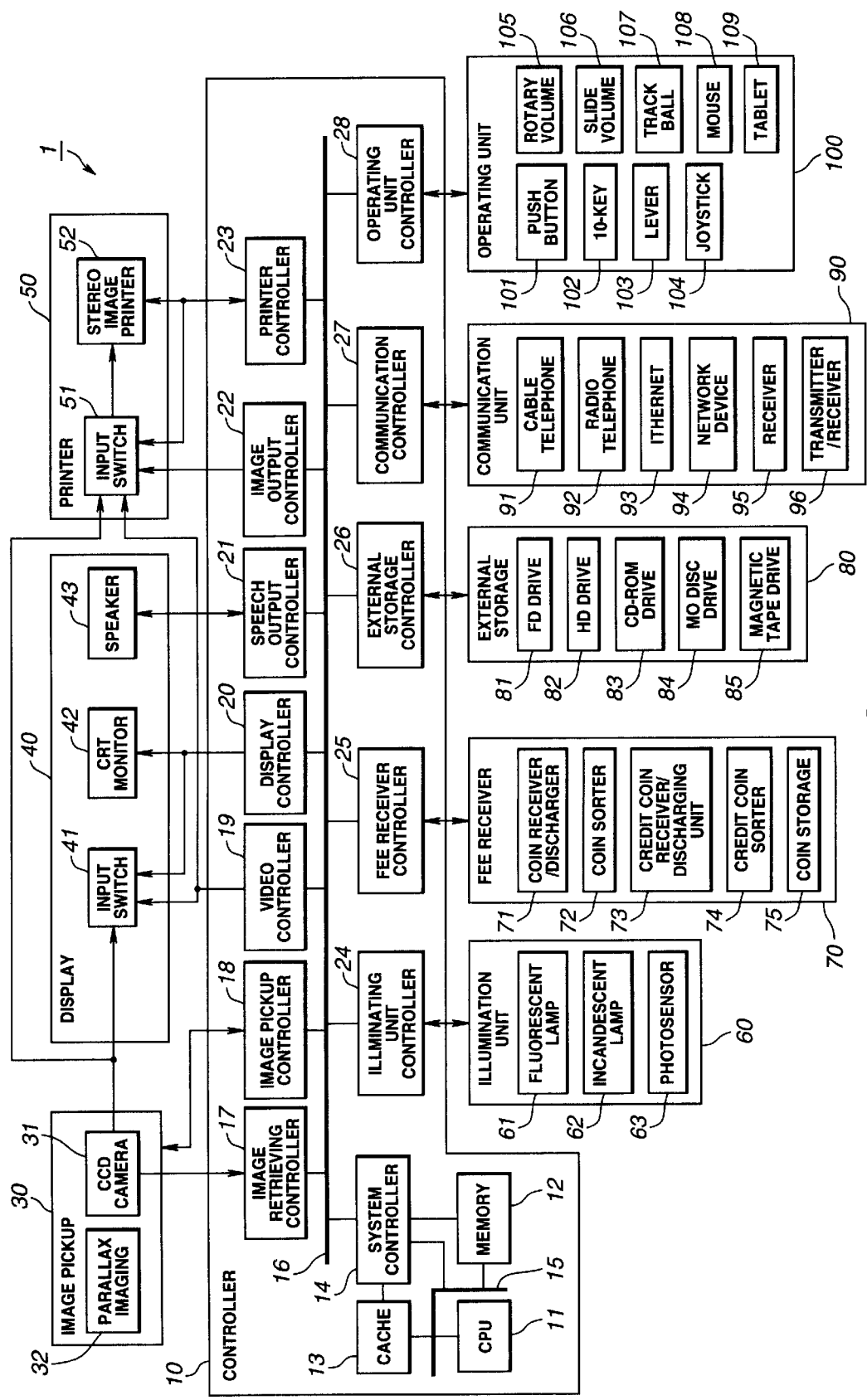
FIG. 13 is a block diagram for illustrating the structure of the image printing device shown in FIG. 12.

The above-described component parts of the image printing device 1 are arranged as shown in FIG. 13.

In the controller 10, the CPU 11 has the functions similar to those loaded on a universal computer. The CPU 11 performs control of the overall device and computational processing on image data inclusive of morphing processing and viewing point conversion processing. In the image printing device 1, having the CPU 11, the functions of the device controller and the image processing unit can be built into the sole controller 10.

The memory 12 is a storage portion for writing or readout out the information under instructions by the CPU 11 or a system controller 14, as later explained, and is designed as, for example, a DRAM (dynamic random access memory). The memory 12 is connected via the system controller 14 to the CPU 11 or to various resources on the computer bus, such as a host bus 15 or a CPU bus 16, in order to store the information. Of course, image data can be stored in the memory 12.

The cache 13 is a high-speed storage unit for storing the information in the memory 12, to which the CPU 11 accesses frequently. The system can be a high-speed system by direct information exchange over the host bus 15 with the CPU 11.

The system controller 14 adjusts the timing of the CPU 11, memory 12, cache 13 or the computer buses, such as the host bus 15 or the PCI bus 16.

The host bus 15 is the information transmitting means, directly connected to the CPU 11, and is able to exchange the information at a high speed with the system controller 14.

The PCI bus 16 is the information transmitting means, separated from the host bus 15, and is connected to the system controller 14. The CPU 11 is able to access various resources connected to the PCI bus 16 via the system controller 14.

An image capturing controller 17 is connected between the PCI bus 16 and the image pickup device 30. The image capturing controller 17 captures the parallax image, photographed by the image pickup device 30, as image data, under control by the CPU 11 and so forth, in order that the parallax image photographed by the image pickup device 30 will be able to be processed by the controller 10. The image capturing controller 17 effects Y/C separation of the NTSC signals outputted by the image pickup device 30 to convert the signals into RGB signals. The image capturing controller 17 A/D converts the RGB signals to capture the resulting signals as image data. The image capturing controller 17 captures image data, digitized by the image pickup device 30, as parallel signals conforming to RS-232C or Centronics, or via an interface, such as SCSI.

An imaging unit controller 18 is connected between the PCI bus 16 and the image pickup device 30. The imaging unit controller 18 issues a control signal for an operational command, such as camera movement for imaging start or imaging of the parallax image, while receiving the control signal from the image pickup device 30 on the operating states, such as camera light stop or amount of camera movement.

A video controller 19 is connected between the PCI bus 16 and the display unit 40 for drawing the information such as that of the image, figure or letters, on an internal video memory, to output the contents to the display unit 40. Of course, the video controller 19 is able to store image data in an internal video memory. The video controller 19 is also able to exchange device characteristics information stored in the CRT monitor 42 of the display unit 40, with the CRT monitor 42, using a portion of the signal line, in accordance with, for example, the VESA DDC (display data channel) standard.

A display controller 20 is connected between the PCI bus 16 and the display unit 40 and, under control by the CPU 11 and so forth, issues the control signal, such as the operational control for the display unit 40, such as the display start or the input switching, while accepting the control signal for the operating state from the display unit 40 of the device characteristics information of the CRT monitor 42.

A speech output controller 21 is connected between the PCI bus 16 and the display unit 40 and, under the command of the CPU 11 and so firth, outputs the speech information as pronounceable speech signals to the display unit 40. The speech output controller 21 D/A converts speech data of 8 bits, sampled at, for example, 32 kHz, to output the sampled speech data as analog signals.

An image output controller 22, connected between the PCI bus 16 and a printer 50, converts the parallax image string data, obtained on photographing by the image pickup device 30, or the parallax image string obtained on morphing processing or viewing point conversion processing by the controller 10, into image data for regenerating the three-dimensional image, to output the resulting image data to the printer 50. When recording the image data as a holographic stereogram on a recording medium for hologram 151, the image output controller 22 D/A converts the image data from the viewing point conversion processing into RGB signals, and outputs the RGB signals via an input switcher 51 of the printer 50 to a holographic stereogram producing device. When recording a stereogram by a lenticular lens or the image used for integral photography by a fly-eye lens, the image output controller 22 converts the image data into parallel signals conforming to, for example, Centronics, or into digital signals, via an interface, such as SCSI.

A printer controller 23 is connected between the PCI bus 16 and the printer 50 and sends a control signal, that is the operational command signal, such as start of recording, input switching or start of various steps of the printing operation, to the printer 50, while accepting the control signal for the operating state from the printer 50, such as the operating states of the various printing steps or printing completion.

An illumination controller 24 is connected between the PCI bus 16 and the illumination unit 60 and, under commands issued by, for example, the CPU 11, issues control signals, including operational commands to the illumination unit 60, such as start of illumination, while accepting control signals, including operating states from the illumination unit 60, such as current, voltage or power of lighting implements, brightness or color hue of the illumination etc.

A charge reception controller 25 is connected between the PCI bus 16 and the charge receiving unit 70 and, based on the information accessing requests from both sides over the PCI bus 16, issues control signals of operating commands to the charge receiving unit 70, such as charge reception start or credit coin card readout start, while accepting the control signal on the operating states from the charge receiving unit 70, such as the received amount, information in the credit coin card, or the amount of stored coins.

An external storage controller 26 is connected between the PCI bus 16 and the external memory 80 and, under the commands of, for example, the CPU 11, controls the writing and readout of the information for a pre-set area in the medium, such as hard disc or the magnetic tape. The external storage controller 26 is connected to the external memory 80 via SCSI or IE1394 etc.

A communication unit controller 27 is connected between the PCI bus 16 and the communication unit 90 and, based on an information access request from various portions in the device an information access request from a communication counterpart, controls the information transmission and reception. Of course, the communication unit controller 27 is able to transmit or receive data such as image data.

An actuator controller 28 is connected between the PCI bus 16 and the actuating unit 100 and, based on a command from the CPU 11, receives the states of a pushbutton 101, ten-key 102, lever 103, joystick 104 or a rotary volume 105, acted on by the user, as later explained, as a control signal. If the actuating unit 100 has the function of sensibly reacting to the actuation of the user, such as by the repulsive power, the actuator controller 28 sends a control signal for commanding an operation to the actuating unit 100. If the actuating unit 100 is such as is able to input only a digital quantity, such as on/off, as in the case of the pushbutton 101, the information such as the number times of actuation or the time duration of actuation of the pushbutton 101 is sent to the actuator controller 28. The CPU 11 executes calculations for conversion to analog quantities based on the information on the operating state transmitted thereto from the actuator controller 28. These calculations for conversion to analog quantities may be executed by the actuating unit 100.

The controller 10, having the above functions, performs calculations of image processing and control of the various portions as will be explained subsequently.

The image pickup device 30 is made up of a CCD camera 31, including a CCD (charge-coupled device) imaging element and the circuitry for converting the resulting image into signals, and a parallax imaging system 32 for causing movement of the CCD camera 31 for imaging the parallax image. The CCD camera 31 outputs the analog signals, such as NTSC signals, or digitized image data, as parallel signals pursuant to RS-232C or Centronics, or via an interface, such as SCSI. The parallax imaging unit 32 is constituted by a feed base, driven by a stepping motor etc, not shown, and causes movement of the CCD camera 31 set on or connected to the feed base. The image signals, inputted to the display unit 40, may be analog signals, such as NTSC signals or RGB signals, or digitized signals, such as GVIF, VESA or FPDI. Although the device for displaying image signals has been explained as a CRT monitor 42, it may also be a direct viewing type TFT liquid crystal display element (thin-film transistor liquid crystal display or TFT-LCD), a projector type display device or a virtual image type display device employing a plasma image display element (plasma display panel or PDP), LCD or a DMD (digital micro-computer device).

The printer 50 includes an input switcher 51 for switching input signals of an image to be printed and a stereo image printer 52 for recording an input image on a recording medium. The printer 50 receives analog signal, such as RGB signals, and digitized image data via parallel signals pursuant to Centronics, and via an interface, such as SCSI, IEEE1394 or USB, to record the input image data on a recording medium. The stereo image printer 52 may, for example, be a holographic stereogram producing device 150, shown in FIGS. 14 and 15, if a holographic stereogram is to be prepared. The holographic stereogram producing device 150 is fed with viewing point conversion processed image data, as RGB data, to record an object light corresponding to these RGB signals on the recording medium for hologram 151 as elementary hologram. The stereo image printer 52 is constructed so that, if a stereogram is to be imaged by a lenticular lens or an image used for integral photography by a fly eye lens, the printer receives digitized image data by parallel signals conforming to, for example, Centronics, as an input, and formulates the printed matter in accordance with an inkjet system employing beat bubbles or pieze element, or electronic photography employing a toner. On the resulting printed matter is affixed a lenticular lens sheet or a fly eye lens sheet.

The illumination unit 60 includes a lighting implement, such as a phosphorescent lamp 61 or an incandescent lamp 62, and a photosensor 63 for detecting the light emitting state, that is brightness or color, of the lighting implement. If the object is illuminated by, for example, the phosphorescent lamp 61, the driving power source of the latter has its driving frequency synchronized with the shutter speed of the CCD camera 31, or the fluorescent lamp 61 is driven by an inverter at a high frequency. It is not mandatory that the illumination unit 60 is provided with an independent photosensor 63 for detecting the light emitting state of the lighting implement. In this case, the image printing device 1 may be constructed so that the CCD camera 31 will perform the function played by the photosensor 63, by checking whether or not the brightness of the image photographed by the CCD camera 31 will be changed before and after the lighting command signal of the lighting implement.

The charge receiving unit 70 includes a money reception ejecting unit 71, a money sorter 72 and a money storage unit 73. The charge receiving unit 70 also includes a credit money reception ejecting unit 74 and a credit money sorter 75. The money reception ejecting unit 71 receives the money, such as paper money or coin, or non-cash coin, and notifies that effect to the money sorter 72 and/or the charge reception controller 25. The money reception ejecting unit 71 also returns the money or change. The money sorter 72 detects the amount of the received money to notify the received amount to the charge reception controller 25. The credit money reception ejecting unit 74 receives and ejects the credit money, such as cash card, credit card or pre-paid card. The credit money reception ejecting unit 74 notifies the fact of the deposition of the credit money to the credit money sorter 75 and/or to the charge reception controller 25. The credit money reception ejecting unit 74 also returns the credit money. The credit money sorter 75 reads out the type of the received money or the recorded information, recorded on the credit money, such as the card number or the residual amount, and notifies the read-out result to the charge reception controller 25. If need be, the credit money sorter 75 rewrites the information recorded on the credit money, such as the residual amount, by a signal from the charge reception controller 25. The money storage unit 73 reserves the money, deposited and received therein. The reserved money may also be recovered subsequently.

The external memory 80 includes a floppy disc drive 81, a hard disc drive 82, a CD-ROM drive 83, a magneto-optical disc drive 84 and a magnetic tape drive 85. The external memory 80 may be removable instead of being fixedly mounted on the image printing device 1. By employing a removable medium, it is possible with the image printing device 1 to use data stored in the medium and thus improved in portability, instead of using only the data stored in the device or data received via the communication unit 90.

The communication unit 90 includes one of the cable telephone, 91, radio telephone 92, Ethernet 94, FDDI (fiber distributed data interface), ATM (asynchronous transfer mode), network equipment 94, such as IEEE1394, a receiver 95 employing the satellite or ground wave, a transmitting/receiving unit 96 employing the satellite or ground wave. By the cable telephone 91 and a modem, not shown, the communication unit 90 transmits or receives image data stored in a dedicated server, not shown, or in an external equipment of a similar structure, receives the program for actuating the device, transmits the information such as the card number etc of the credit money or receives the authentication information of the credit money.

The actuating unit 100 includes a pushbutton 101, ten-key 102, lever 103, joystick 104, rotary volume 105, slide volume 106, trackball 107, mouse 108 and a tablet 109. The actuating unit 100 has the function of sensibly reacting to the actuation of the user, such as by a repulsive power, if need be. The actuating unit 100 also has actuating means, such as rotary volume 105, that is able to input analog quantities. The actuating unit 100 also has the function of converting input digital quantities, into analog quantities, even if the actuating means is such as is able to input only the digital quantities, such as on/off, such as the pushbutton 101, based on the actuating states, such as the number of times of thrusting or the thrusting time duration of the pushbutton 101. The actuating unit 100 includes the joystick 104, capable of issuing commands in the four directions, that is in the up-and-down direction and in the left-and-right direction, and a time measurement circuit, and notifies the direction in which the joystick 104 is levelled and the duration of the levelling, to the actuator controller 28.

The above-described image printing device 1 is in operation by the program software of the CPU 11, with the respective portions thereof, primarily including the controller, operating in concert.

Figure 14:
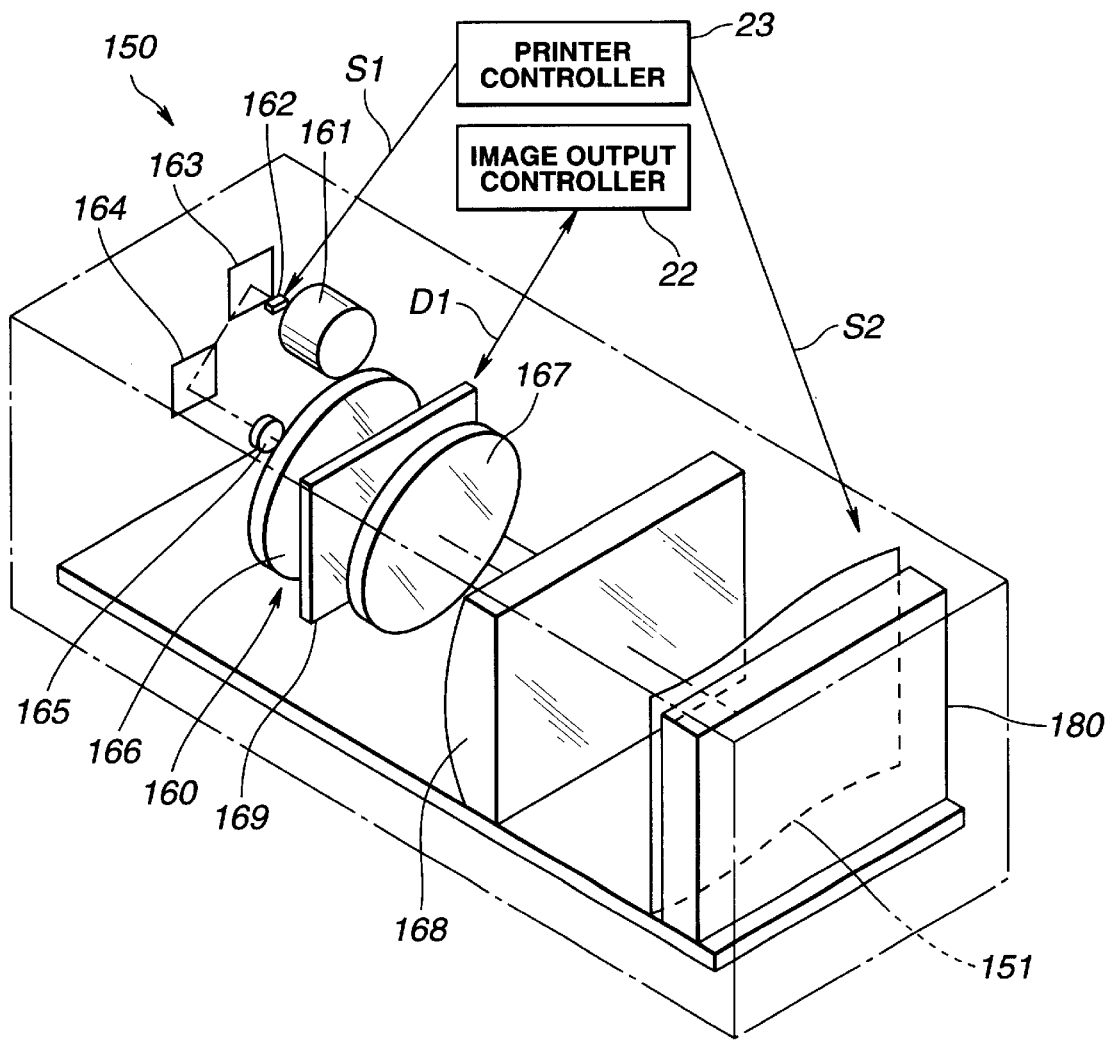
FIG. 14 is a schematic view showing the overall structure of a holographic stereogram as an example of a stereo image printer of the image printing device.

Referring to FIGS. 14 and 15, the holographic stereogram producing device 150, used as the stereo image printer 52 when the image printing device 1 formulates the holographic stereogram as a printed matter regenerating a three-dimensional image, is hereinafter explained.

The respective components of the holographic stereogram producing device 150, shown in FIG. 14, are in operation under control of the printer controller 23 described above. That is, the object light L2, corresponding to the image data D1 of the elementary hologram outputted by the image output controller 22 and the reference light L3 fall on a light exposure recording unit P1 and resulting interference fringes are directly recorded on light exposure on the recording medium for hologram 151 to prepare a holographic stereogram. The recording medium for hologram 151 is comprised of, for example, a photosensitive film, and is loaded on a film cartridge, not shown.

The holographic stereogram producing device 150 includes an optical system 160 for preparing the holographic stereogram, and a recording medium feed unit 180 for intermittently driving the recording medium for hologram 151.

The optical system 160 includes an incident optical system 160A, an object optical system 160B and a reference optical system 160C, as shown in FIG. 15A. The object light optical system 160B and the reference optical system 160C are designed so that respective optical path lengths of the object light L2 and the reference light L3 to the exposure light recording unit P1 will be equal to each other in order to raise the possibility of interference between the object light L2 and the reference light L3.

The incident optical system 160A is made up of a laser light source 161, radiating the laser light L1, a shutter mechanism 162 for switching between light radiation and interruption by the transmission or interruption of the laser light L1 and a half mirror 163 for splitting the laser light L1 into the object light L2 and the reference light L3.

The laser light source 161 is constructed as a semiconductor excited YAG laser device, emitting the laser light L1 of a sole wavelength and high coherence, an air-cooled argon ion laser device or an air-cooled krypton laser device.

The shutter mechanism 162 performs an opening/closure movement by a control output S1 outputted by the printer controller 23 in the timing of the outputting of the elementary hologram image data D1 from the image output controller 22 to permit the laser light L1 to fall via a downstream side optical system on the recording medium for hologram 151 located in the exposure light recording unit P1 or to interrupt the incidence of the laser light L1 on the recording medium for hologram 151.

The half mirror 63 splits the incident laser light L1 into transmitted light and reflected light, used as the object light L2 and as the reference light L3, respectively. The object light L2 and the reference light L3 are incident on an object light optical system 160B and on a reference light object system 160C, provided on the downstream side, respectively.

Specifically, the object light optical system 160B is made up of plural optical components, namely a total reflection mirror 164, a first cylindrical lens 165, a collimator lens 166, a projection lens 167 and a second cylindrical lens 168. These optical components are arrayed in the above-mentioned order along the optical system of the object light L2.

The first cylindrical lens 165 is combined from a convex lens and a pin hole, and is adapted for diffusing the object light L2, transmitted through the half-mirror 163 and reflected by the total reflection mirror 164 in a one-dimensional direction in meeting with the width of the display surface of a transmission liquid crystal display unit 169 as later explained.

The collimator lens 166 collimates the object light L2, diffused by the first cylindrical lens 165. The collimated object light L2 falls on the transmission liquid crystal display unit 169.

The projection lens 167 projects the object light L2 on a second cylindrical lens 168.

The second cylindrical lens 168 converges the collimated object light L2 in a transverse direction on the exposure light recording unit P1.

In the object light optical system 160B, there is arranged the transmission liquid crystal display unit 169 between the collimator lens 166 and the projection lens 167. On the transmission liquid crystal display unit 169, elementary hologram images are sequentially displayed, based ion the elementary hologram image data D1 outputted by the image output controller 22.

In the object light optical system 160B, designed as described above, the incident object light L2, split from the incident optical system 160A, is diffused by the first cylindrical lens 165 and falls on the collimator lens 166, whereby it is turned into the collimated light. In the object light optical system 160B, the incident object light L2, incident on the transmission liquid crystal display unit 169 via the collimator lens 166, is modulated in meeting with the elementary hologram image displayed on this transmission liquid crystal display unit 169, at the same time as it is incident via the projection lens 167 on the second cylindrical lens 168. The object light optical system 160B causes the modulated object light L2 to fall on the recording medium for hologram 151 of the exposure light recording unit P1 during the opening operation of the shutter mechanism 162.

Specifically, the reference optical system 160C is made up of a cylindrical lens; 170, a collimator lens 171 and a total reflection mirror 172. These optical components are arranged in this order along the optical axis of the reference light L3.

Similarly to the first cylindrical lens 165 of the above-mentioned object light optical system 160B, the cylindrical lens 170 is combined from a convex lens and a pin hole, and operates for diffusing the reference light L3, reflected and split by the half mirror 163, in a one-dimensional direction in accordance with a pre-set width, that is the width of the display surface of the transmission liquid crystal display unit 169.

The collimator lens 171 collimates the reference light L3, diffused by the cylindrical lens 170, to parallel light.

The total reflection mirror 172 reflects the reference light L3 to cause the reference light L3 to fall on the recording medium for hologram 151 of the exposure light recording unit P1 from its rear side.

The recording medium feed unit 180 includes a roll, not shown, and intermittently feeds the recording medium for hologram 151 by one elementary hologram in the direction indicated by arrow a in FIG. 15. The recording medium feed unit 180 runs the recording medium for hologram 151 intermittently based on a driving output S2 sent out from the printer controller 23, each time the light exposure recording for one elementary hologram comes to a close, to put a non-exposed area of the recording medium in register with the exposure light recording unit P1. In the holographic stereogram producing device 150, the above-described shutter mechanism 162 is actuated, based on the control output S1 sent out from the printer controller 23 in timed relation to the operation of the recording medium feed unit 180, in order to open the optical path of the laser light L1.

By the above-described sequence of operations of the holographic stereogram producing device 150, constructed as described above, the elementary hologram image, corresponding to the elementary hologram image D1 furnished from the image output controller 22, is recorded on light exposure on the recording medium for hologram 151 as strip-shaped or dot-shaped elementary holograms to formulae a holographic stereogram.

Figure 16:
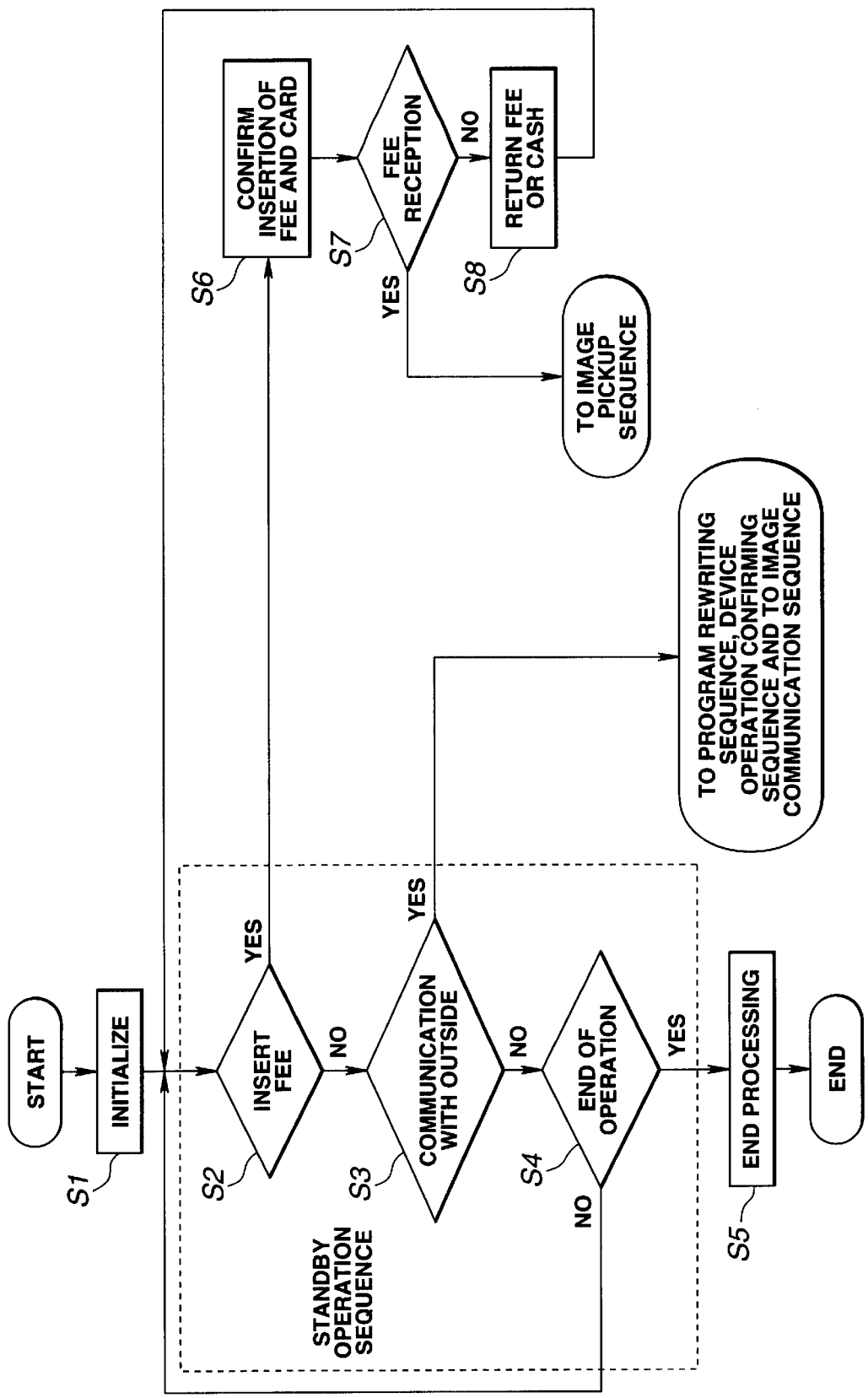
FIG. 16 illustrates a sequence of steps from an initial stage of the operation through a standby operational sequence and fee reception to an image pickup sequence in the image printing device.
Figure 17:
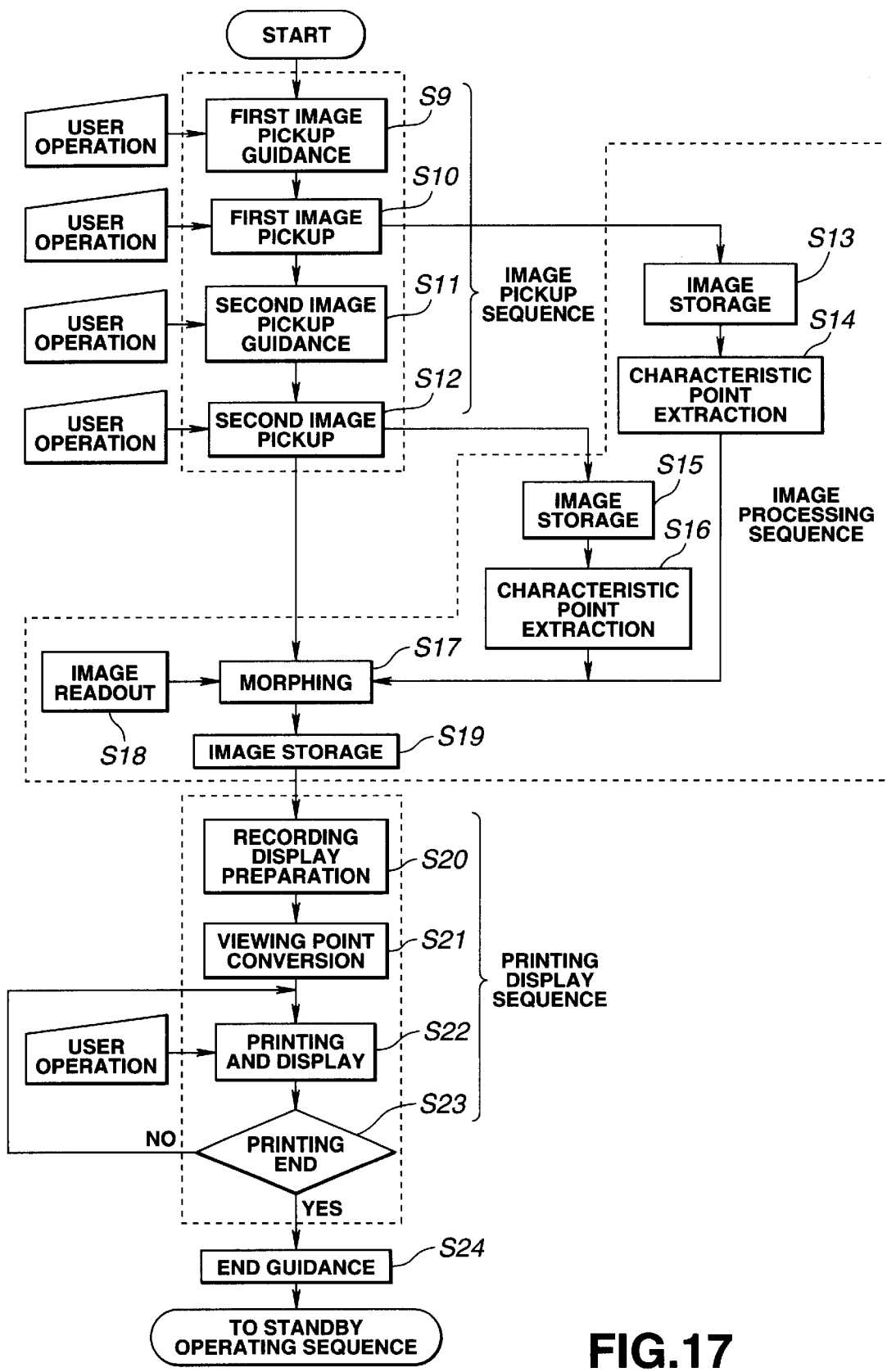
FIG. 17 illustrates a sequence of steps reverting from the image pickup sequence through an image processing sequence and a printing-display sequence back to the standby operational sequence.
Figure 18:
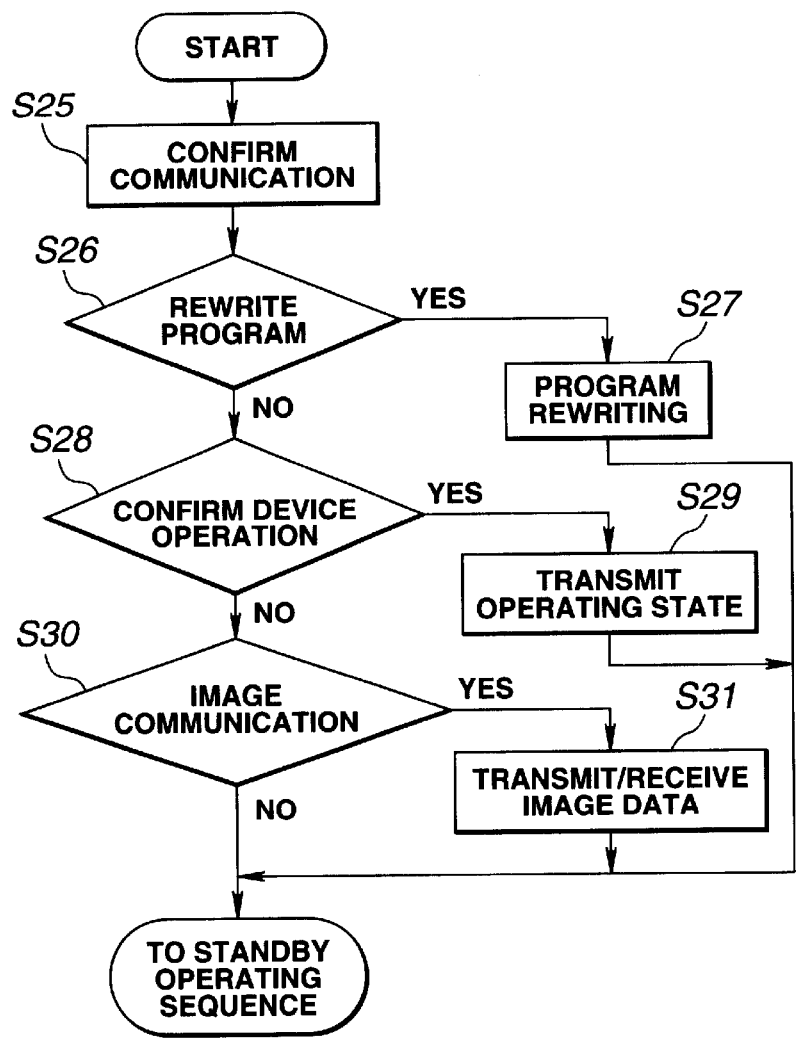
FIG. 18 illustrates a sequence of steps from a program rewriting sequence, a device operation confirming sequence and an image communication sequence back to the standby operational sequence.

The image printing device 1, constructed as described above, performs a series of operations shown in FIGS. 16 to 18 to formulate the printed matter which realizes a three-dimensional image. The series of operations of imaging an object twice to obtain two sets of parallax image strings, and morphing the strings to prepare the printed matter realizing a three-dimensional image having different rates of change depending on the viewing directions, are hereinafter explained.

At step S1 in FIG. 16, the image printing device 1 initializes the device, and performs a standby operational sequence of steps S2 to S4. Specifically, the image printing device 1 checks at step S2 whether or not the fee has been deposited. If it is found that the fee has been deposited, the image printing device 1 proceeds to step S6. If it is found that the fee has not been deposited, the image printing device 1 checks at step S3 whether or not there is a communication request with external equipments. If it is found that there is a communication request with the external equipment, the image printing device 1 proceeds to the program rewriting sequence, device operation confirming sequence or to the image communication sequence. If the image printing device 1 has decided that there is no communication request with the external equipment, the image printing device 1 checks at step S4 whether or not the stand-by operation is to be terminated. If the standby operation is to be terminated, the image printing device 1 proceeds to the termination processing at step S5 to terminate a series of operations. If the standby operation is to be continued, the processing as from step S2 is again executed. In this standby operating sequence, the image printing device 1 confirms the operation of various components, or displays and pronounces ads or PR guides on the device using images or speech.

After verifying at step S2 that the fee has been deposited with the coin money or credit money, the image printing device 1 at step S6 confirms the amount of the fee or the card. If, at step S7, it is confirmed that the conditions for using the device, such as the fee amount, are met, the image printing device 1 proceeds to the imaging sequence, as later explained. If the conditions are not met, the image printing device 1 proceeds to the operation of returning the fee or the card at step S8. If, in the image printing device 1, it takes a lot of time to confirm the amount received or the authorization information of the credit money, the fee confirming operation may be continued during the image pick-up operation.

If the condition of using the device, such as the amount of the fee deposited, is met, the image printing device 1 proceeds to the image pickup sequence of steps S9 to S12. If this image-pickup sequence is started, the image printing device 1 displaces or pronounces the guidance of the first imaging operation on the display unit 40 at step S9. Then, as the confirmation by the user is acquired, the first image pick-up operation at step S10 is carried out by the image pickup device 30. This image-pickup sequence is started by the control signal from the imaging unit controller 18 and continued as the CCD camera 31 is moved in, for example, the horizontal direction as the parallax imaging unit 32 is in operation. By this image-pickup sequence, the image printing device 1 able to produce a set of parallax image strings from plural parallax images. At step S11, the second guidance for the imaging operation, the second image pick-up operation is carried out at step S12. By this image-pickup sequence, the image printing device 1 is able to produce a second set of parallax image strings. In these guides for the imaging operations, guides for the operational sequence by the actuating unit 100 for the user, selection whether or not an image is to be synthesized to photographed parallax images, or the selection as to whether or not the imaging index image for guiding the object during imaging, are given by the information furnished by the image or the speech from the display unit 40. In the image printing device 1, the user acts on the actuating unit 100 in accordance with the imaging guidance to give imaging commands via the actuating unit 100.

In the image printing device 1, the image processing sequence is carried out substantially in parallel with the image-pickup sequence. In the image printing device 1, the parallax image string data, comprised of plural parallax images obtained on photographing at step S10, are stored in the external equipment via the external memory 80 and the communication unit 90. At step S14, the image processing is started for extracting characteristic points for each parallax image. Similarly, the parallax image string obtained by second imaging at step S12 is stored as the parallax image string data at step S15 to execute characteristic point extraction at step S1 6.

After generating the parallax image string data and the characteristic point data, the above-described morphing is carried out at step S17. The image printing device 1 is responsive to the number of outputted printer matter of the printing and display sequence next following the image processing sequence and the number of the displayed and outputted parallax image strings to change the rates of change of the morphing processing. For obtaining a parallax image string, morphed in terms of a pair of images as a unit, for two sets of the parallax image strings each made up of 100 parallax images, the rates of changes for morphing are set to 0/99, 1/99. 2/99. ..., 98/99, 99/99. The image printing device 1 reads out parallax image string data or image data stored in the external memory 80 at step S18, if required, in addition to the parallax image string data obtained on imaging, in order to carry out morphing. The parallax image string data obtained on morphing are stored at step S19 as parallax image string data for outputting the printed matter in the external memory 80.

On generation of the data for print outputting by the image processing sequence, the image printing device 1 starts the printing and displaying sequence at steps S20 to S23.

In the present printing display sequence, the parallax image string data, imaged or processed by the above-described processing, is recorded by the printer 50 on the recording medium for printing. If the image processing and recording are time-consuming, the user has to wait. Thus, the ad or a certain image or a certain speech in the parallax image string being recorded is displayed by the display unit 40 or pronounced. First, at step S20, the image printing device 1 records the parallax image string data on the recording medium or makes preparations for the image display, after which the image printing device 1 at step S21 performs viewing point conversion processing in accordance with the system of the device adapted for printing the parallax image string data. At step S22, the image printing device 1 records the viewing-point-conversion-processed parallax image string on the recording medium, by way of the printing operation, for formulating the printed matter and for displaying a certain image of the parallax image string. The image printing device 1 arrays a required number of the viewing-point-conversion-processed parallax image strings and records the arrayed parallax image strings on the recording medium by way of printing to formulate the printed matter. If, with the use of the above-described holographic stereogram formulating device 150, a plurality of sets of parallax image strings used for regenerating a certain three-dimensional image are recorded on light exposure, an elementary hologram image generated on arranging areas (frames) required for recording the parallax image string sets on light exposure responsive to an optional request by the user is displayed on the transmission liquid crystal display unit 169 to effect recording on light exposure on the recording medium 151 to prepare the holographic stereogram. In this printing operation, the image printing device 1 is able to record the parallax image string by the parallax image string data morphed depending on optional rates of change on the recording medium. As the display operation, demonstration or articulation of the ads or device guides are performed, while morphed images obtained on processing, for display, certain images of the parallax image string to be recorded, for example, two images obtained on imaging the object from the front side by the image pickup device 30, are chronologically displayed. The image printing device 1 not only chronologically displays the morphed images within a pre-set time, but also changes the display speed of the chronological image data or the display sequence depending on the contents optionally entered by the actuating unit 100 in displaying the morphed images. That is, the image printing device 1 detects the analog quantities, such as amounts of movement or change, produced on the user actuating the rotary volume 105 or the slide volume 106 of the actuating unit 100, to display the morphed image of the object or the plural morphed images stored in the external memory 80, depending on the analog quantities. For this display operation, it is possible to generate plural sets of morphed parallax image strings corresponding to optional rates of change at the outset to display the morphed image selected on performing inputting operations.

In this manner, it is possible for the image printing device 1 to formulate the printed matter regenerating the morphed three-dimensional image as well as to cancel or retard the image change during the printing waiting time for the morphed image exhibiting high correlation of picture patterns among different images to observe the change to manifest high amusement affording properties.

At step S23, the image printing device 1 checks at step S23 whether or not the above-described printing operation has come to a close. If the printing operation is decided to have come to a close, the above-described display operation is terminated directly after the decision or after lapse of a certain time length as from the decision. At step 24, the image printing device 1 displays the guide etc stating the completion of formulation of the printed matter, or articulates that effect, by way of the printing end operation, to revert to the standby operating sequence.

If a request for communication with the external equipment is made via the communication unit controller 27 at step S3 in the above-described standby operating sequence, the image printing device 1 starts the operation of the program rewriting sequence, device operation confirming sequence or the image communication sequence, as shown in FIG. 18. At step S26, the image printing device 1 decides whether or not there is a program rewriting request. If it is here verified that there is the program-rewriting request, the image printing device 1 proceeds to the program rewriting processing at step S27.

This program rewriting processing rewrites the program inside the device under a command from outside. In this processing, the image printing device 1 rewrites the image processing program for morphing, program for controlling the operation of various components of the device or the program for controlling the display, such as ads or device guides, or the articulating operation, for improvement or maintenance. The image printing device 1 stores the program data, received via the communication unit controller 27, in the storage unit, such as memory 12, or in the external memory 80, and subsequently overwrites or supplements part or all of the program corresponding to the rewriting under control by the CPU 11. The image printing device 1 stores program data, received via the communication unit controller 27, in a storage unit, such as a memory 12, in the external memory 80, and overwrites or supplements part or all of the program pertinent to the rewriting. This permits the image printing device 1 to execute the new program by the CPU 11.

If the image printing device 1 has verified at step S26 that there is no program rewriting request, it checks at step S28 whether or not there is a device operation confirming request. If the image printing device 1 has verified that there is this request, the image printing device 1 transmits at step S29 the state of the operation of the device periodically or under a command from outside. That is, the image printing device 1 transmits the total of the received amount, the number of printed sheets, the remaining number of the printing sheets, the operating states of the device and whether or not the various parts of the device are operating as normally.

If the image printing device 1 has verified at step S28 that there is no such request, it verifies at step S30 whether or not there is the image transmission request. If the image printing device 1 has found that there is such request, the image printing device 1 at step S31 transmits or receives image data in use under an image communication command in the imaging sequence or a command from outside. That is, the image printing device 1 is connected to, for example, an external image data server, recalls an external image data server for communication, and receives the image data inclusive of the parallax image string data. The image printing device 1 saves the image data in the in a storage unit, such as memory 12, or in the external memory 80, to utilize the parallax image string data used for image processing and preparation of the printed matter as image data used as ads or as information guides for the device. The image printing device 1 sends the parallax image string data, generated on morphing, to an external equipment in order to allow the external equipment to use this parallax image string data. The image printing device 1 is also able to register the parallax image string data, obtained on imaging, to an external image data server for registration.

If, after the end of processing at step S31 and at step S30, the image printing device 1 has verified that there is made no image communication request, the image printing device 1 again proceeds to the standby operating sequence.

With the image printing device 1, maintenance of the device may be facilitated by having the communication function. Since the image printing device 1 is able to perform morphing not only with the parallax image string data obtained on imaging with the image pickup device 30, but also with the image data including the parallax image string data received over the communication network, image data of different objects not present at the same place can be morphed to produce the printed matter to improve convenience for the user. It is also possible to furnish an image morphed with parallax image string data of celebrities or animation characters to improve amusement affording properties.

The processing in the above-described guidance for imaging is explained in detail.

Figure 19:
FIG. 19 illustrates an object imaged by the image printing device.
Figure 23:
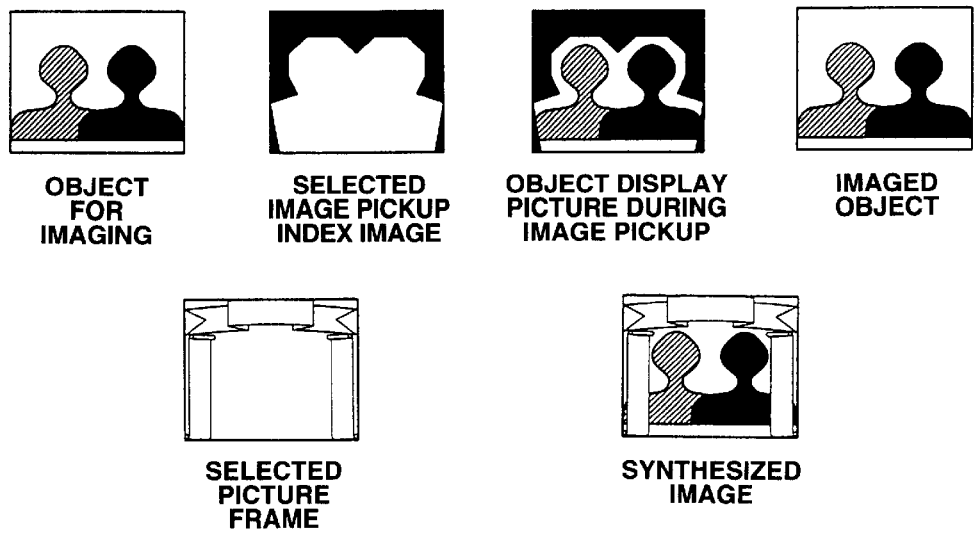
FIG. 23 illustrates how, when an object is two persons, an imaging index image is displayed and a synthesized image is generated.

The processing contents of the image printing device 1 are improved by user actuation in the image pickup guidance. For example, if the user has opted for doing nothing in the image pickup guidance, that is for directly processing the object, the image printing device 1 only images the object, as shown in FIG. 19. If, on the other hand, the user has opted for selecting a image frame etc generated taking the parallax into account to effect image synthesis, the selected image frame is superposed on the imaged object, as shown in FIG. 20, to generate the synthesized image. This synthesized image may hide the object, as in the case of a picture frame, or be hidden by the object, as in the case of the background. The synthesized image may also be synthesized from an image drawn by an actuation input from the user, instead of being synthesized from an image pre-stored in the external memory 80. It is also possible to generate a synthesized image by entering letters or numerical figures from the ten-key 102, or by the user directly issuing an image drawing command by the mouse 108 or the tablet 109 to generate the synthesized image.

Thus, with the image printing device 1, a photographed image can be synthesized with an image, such as an image frame, to offer high amusement furnishing properties to users.

With the image printing device 1, a photographing index image, used for guiding the object position to effect morphing in a more satisfactory manner, can be displayed on the display unit 40. If, in the imaging guidance, the user has opted for displaying the photographing index image, such photographing index image, selected in meeting with the object to be imaged, is displayed on the CRT monitor 42, as shown in FIG. 21.

By imaging the object at a position in register with the photographing index image, it is possible with the image printing device 1 to obtain an image in which the object in a photographed image has the position or size of, for example, the head of the user, in an optimally matched state. By limiting the object position in the image in this manner, the processing of characteristic point extraction can be facilitated in the morphing in the image printing device 1. That is, in the image printing device 1, it is possible to limit the search range of characteristic points, improve the extraction accuracy, use a simpler extraction method and to expedite the extraction processing. Also, in the image printing device 1, it is possible to store data of the characteristic points of fixed positions matched to the photographing index image at the outset and to use the characteristic points to omit the processing of extraction of characteristic points from the image of the imaged object.

Also, with the image printing device 1, it is possible to select and execute both the processing of generating a synthesized image on synthesizing an image frame and the processing of displaying the photographing index image for generating an image. If, in this case, the user selects the photographing index image and an image frame in the imaging guidance and subsequently images the object in meeting with the photographing index image, the image frame can be superposed in a state of the matched position or size of the object in the image, thus producing a synthesized image.

It is also possible to provide plural photographing index images, instead of a sole photographing index image, in the image printing device 1, for selection by the user. That is, the image printing device 1 displays such a photographing index image having two persons, as shown in FIG. 21, instead of one person, as shown in FIG. 21. With the image printing device 1, the user is able to image the object in the imaging guidance provisionally and to select one of plural photographing index images automatically. If, for example, an image with three persons side-by-side is produced by provisional imaging, a photographing index image for three persons arrayed side-by-side can be selected automatically.

Figure 24:
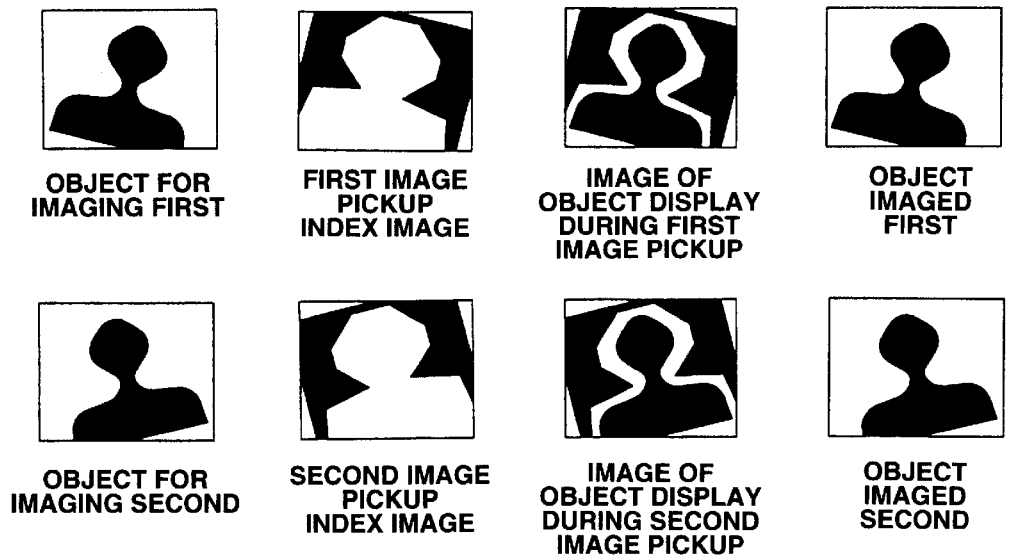
FIG. 24 illustrates an imaging index image in the image printing device and specifically, illustrates how, in the first and second image pickup operations, the imaging index image is changed.

In the image printing device 1, a synthesized image of the photographing index image in the first photographing and/or a synthesized image of the photographing index image and/or the image frame in the second photographing may be different from each other, as shown for example, in FIG. 24. By using the image for the first photographing different from that for the second photographing, a feeling of movement is invoked in the morphed image, thus producing an image with high amusement affording properties.

In the image printing device 1, the parallax image string data stored in the external memory 80 or parallax image string data stored in the external equipment such as a dedicated server or other similar devices via communication unit 90 may be selected and morphed, as described above, instead of performing an imaging operation by the user doing inputting processing in the imaging guidance. For example, face data of celebrities or animation characters may be stored and selected in association with the first image-pickup operation, with the object then being imaged solely for the second image pickup operation by the image pickup device 30. Alternatively, the stored parallax image string data may be selected for both the first and second image pickup operations to effect the morphing.

Figure 25:
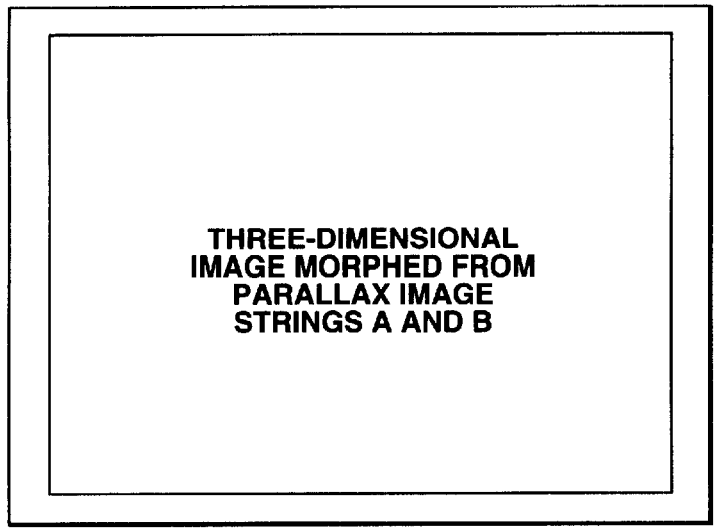
FIG. 25 illustrates an example of a printed matter prepared by the image printing device, and specifically shows how only the results of morphing for a frame are outputted.
Figure 26:
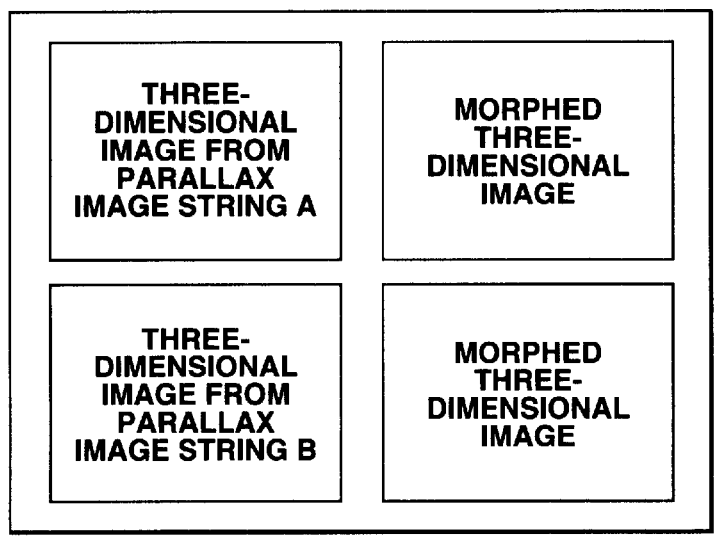
FIG. 26 illustrates an example of a printed matter prepared by the image printing device, and specifically shows how an image corresponding to the original parallax image string prior to morphing for four frames are outputted.

The image printing device 1 formulates, by the above-described sequence of process steps, the printed matter of the contents desired by the user. For example, the image printing device 1 formulates a recording area and produces the printed matter in which only the results of the morphing processing are recorded in a frame, as shown in FIG. 25. On the other hand, if there are three or more frames, it is similarly possible to prepare the printed matter in which both a three-dimensional image regenerated from the original parallax image string prior to the morphing and a three-dimensional image regenerated from the parallax image string generated on morphing from the two sets of the parallax image strings can be reproduced. The contents of the printed matter can be optionally determined by the user inputting the contents in the above-described imaging guidance. If the recorded morphed parallax image strings are recorded on a larger number of sheets than the number of sets of the original premorphing parallax image string, and if there exist two or more users, the results of the printing can be distributed among plural users.

Other structures of the above-described image printing device 1 are hereinafter explained with reference to FIGS. 27 to 30.

Figure 27:
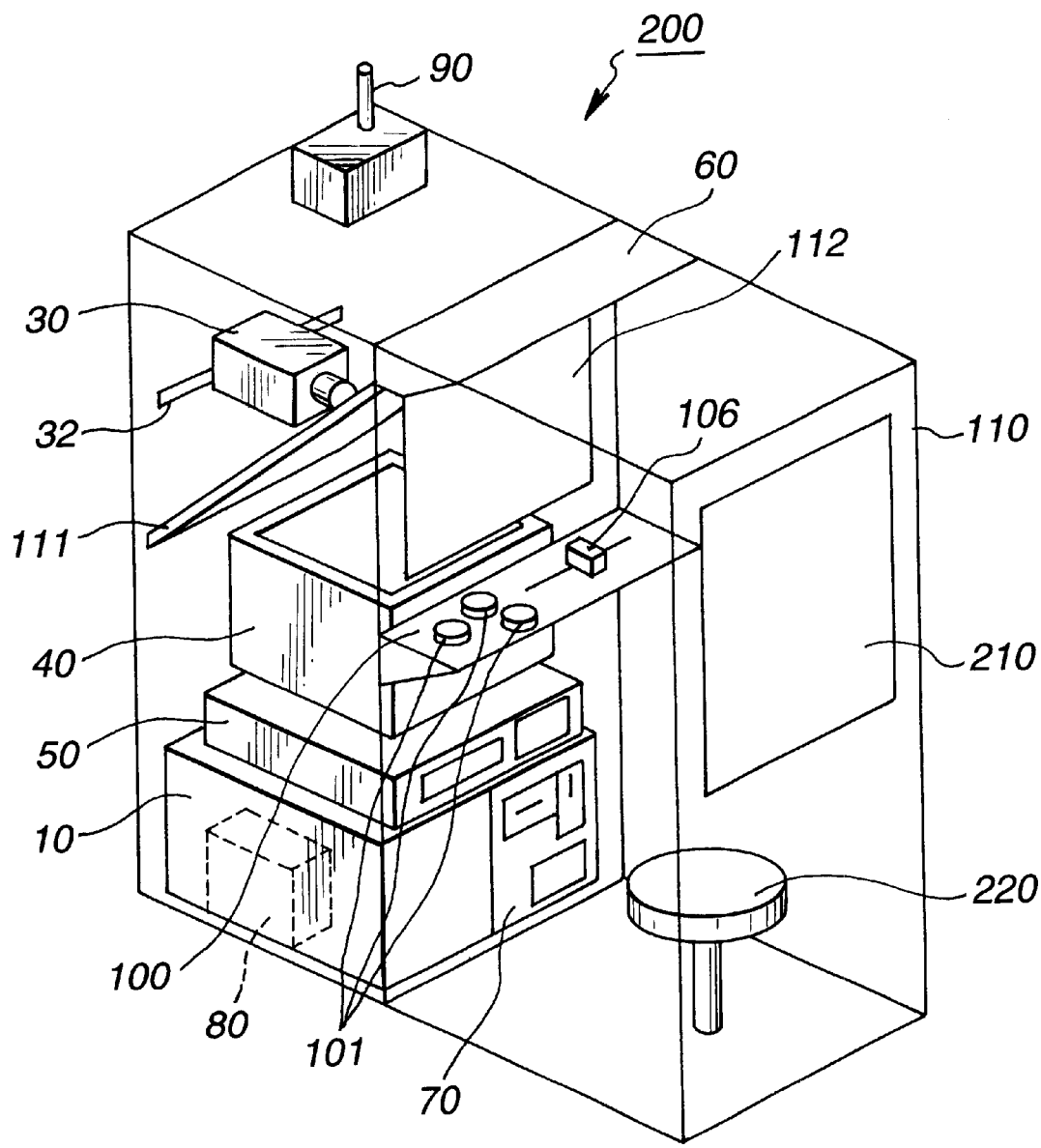
FIG. 27 is a perspective view showing the appearance of the image printing device shown as a second embodiment of the present invention.
Figure 28:
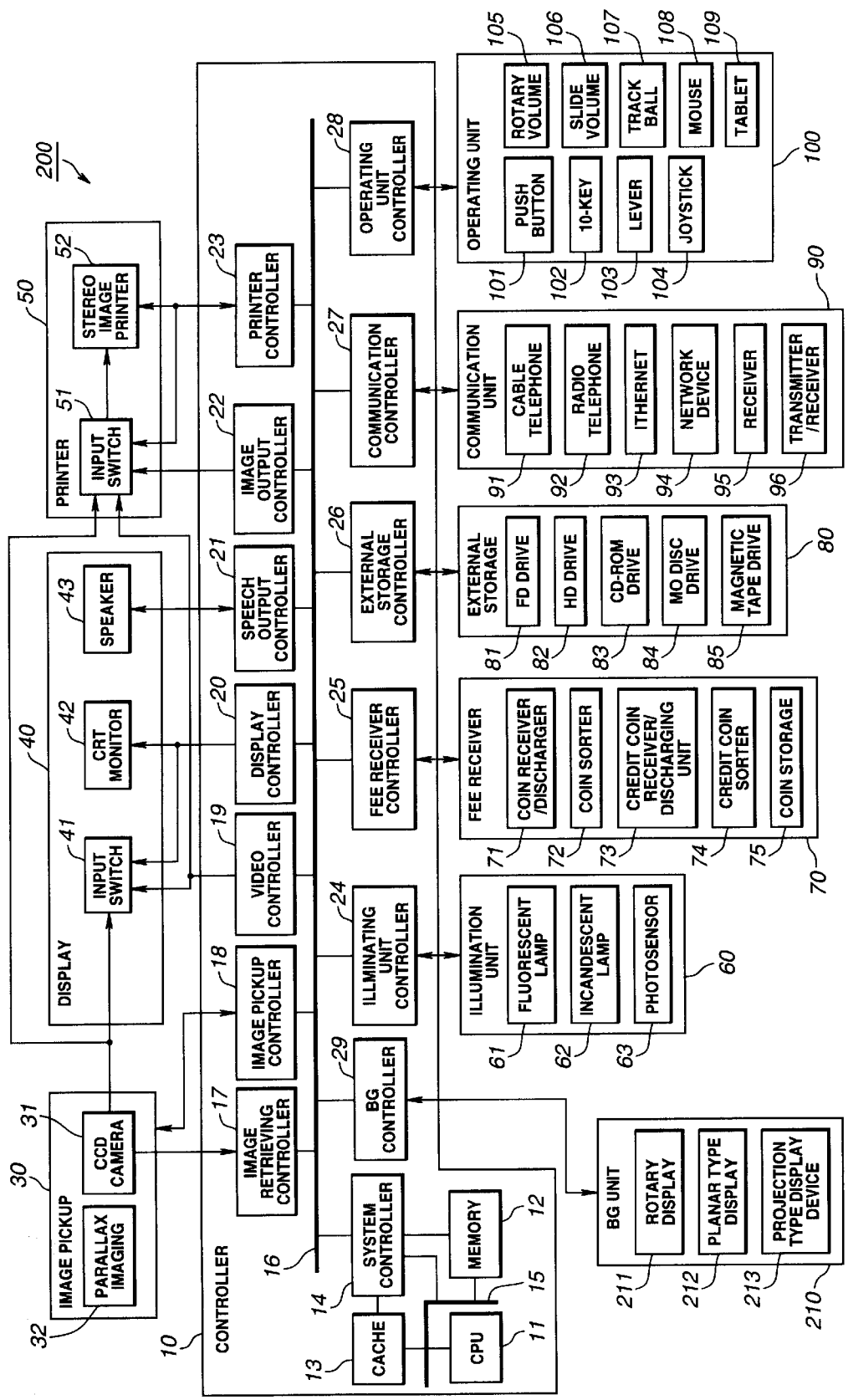
FIG. 28 is a block diagram showing the structure of the image printing device.

An image printing device 200 of the second embodiment of the present invention, shown in FIGS. 27 and 28, has the basic structure in common with that of the image printing device 1 shown in FIGS. 12 and 13, and is characterized in having a background portion 210 and an object holding portion 220. Therefore, the structure similar to that of the image printing device 1 shown in FIG. 13 is depicted by the same reference numerals without being explained in detail.

Referring to FIG. 27, the image printing device 200 has the above-mentioned various components, with the background portion 210 for demonstrating the background of the object and the object holding portion 220 holding the object in stability.

The background portion 210 is arranged at back of the object in register with a photographing window for displaying the background. The image displayed by this background 210 is photographed along with the object by the image pickup device 30.

The object holding portion 220 is constructed by, for example, a chair, and can be adjusted in height and position optionally. In the image printing device 200, if the object is held in the object holding portion 220, the object position or size in the image can be matched over two or more photographing operations.

The block diagram for the image printing device 200, having the above-described functions, is constructed by adding, as shown in FIG. 28, a background portion 210 and a background controller 29 to the image printing device 1 shown in FIG. 13.

The background controller 29 is connected between the PCI bus 16 and the background portion 210 and, under a command from the CPU 10, sends a control signal for operational commands, such as background display start or background switching.

The background portion 210 displays the background of uniform non-saturated color, such as gray color, the background of uniform specified color, such as blue color, or specified pattern of pictures, such as animation characters. The background portion 210 also displays the background selected from plural picture patterns or images by a rotary display 211 and the background displayed by the planar type display device planar type display device 212 or the projection type display device 213. In this manner, the background portion 210 displays the fixed or variable background. The image printing device 200 uses the background of specified color, such as uniform blue color hue, to synthesize an image as a photographing image, by chroma key or luminance synthesis, to produce an optional image as the background.

Figure 29:
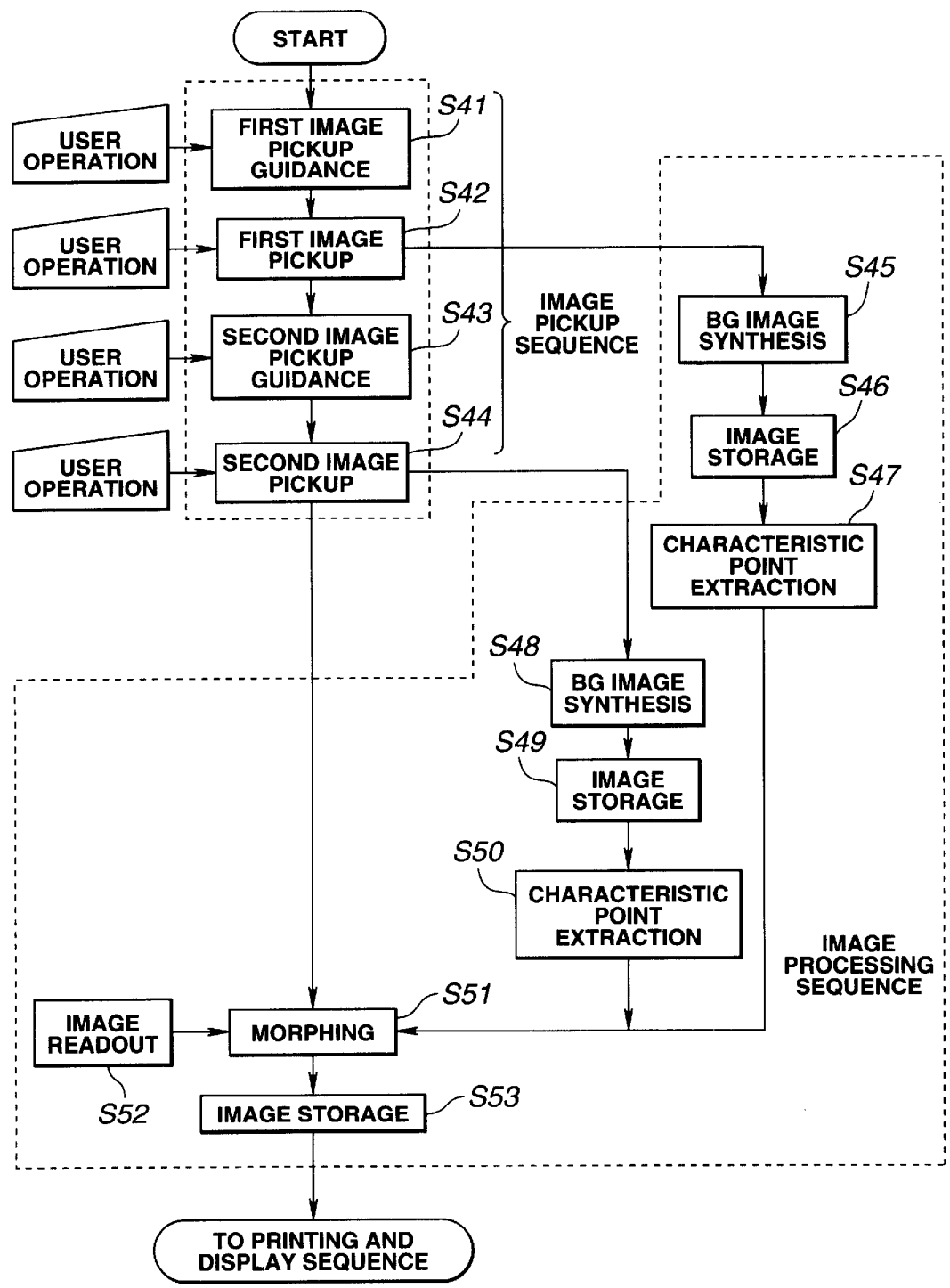
FIG. 29 illustrates a sequence of steps in the image printing device from synthesis of a background image in the image processing sequence until transition to the printing/display sequence.

FIG. 29 shows a sequence of operations for synthesizing the image of the object and the background image by chroma key processing and luminance; synthesis using the background of the specified color, such as blue color of uniform blue color hue. The background portion 210 thus displays the fixed or variable background. In this image printing device 200, employing the background of specified color, such as blue color of uniform hue, an optional image can be synthesized to the photographed image by chroma key synthesis or luminance synthesis in order to use an optional image as the background.

A sequence of operations for synthesizing the image of the object and the background image by chroma key synthesis or luminance synthesis, using the background of specified color, such as blue color of uniform color hue, is now explained with reference to FIG. 29. In the image printing device 200, since this processing is carried out in a stage of proceeding from the above-described image pickup sequence to the image processing sequence, no description is made of the other operations in the operational sequence. Similarly to the above-described first embodiment, the preferred embodiment images the object twice to produce two sets of the parallax image strings, which then are morphed as described above to produce the printed matter reproducing a three-dimensional image with a rate of change differing with the direction with which the image is viewed.

The image printing device 200 displays or articulates the guidance for the first photographing on the display unit 40 and, as it acquires approval by the user, executes first photographing at step S42 in the image pickup device 30, as shown in FIG. 29. In the parallax image string, obtained by this photographing, the blue color, displayed by the background portion 210, for example, is demonstrated. The image printing device 200 discriminates the color or luminance of the image displayed on the background portion 210 to synthesize a pre-selected image on a portion of the parallax image judged to be the background, taking the parallax into account. The image printing device 200 is able to find the amount of parallax corresponding to the parallax image string obtained on photographing. The parallax image string, to which the background is synthesized as described above, is stored in the external memory 80 as the parallax image string data, and the image processing is started for characteristic point extraction at step S47.

After the second guidance at step S43, the image printing device 200 proceeds to the second photographing at step S44, as it acquires the approval by the user. As after the first photographing, the image printing device 200 at step S48 synthesizes the background image and synthesizes the background image and stores the resulting parallax image string data at step S49. The image printing device 200 then proceeds to step S50 to extract the characteristic points.

The image printing device 200 at step S51 morphs the parallax image string data, to which has been synthesized the background, produced as described above as it reads the parallax image string data or image data stored in the external memory 80 at step S52, to store the resulting parallax image string data at step S53.

The image printing device 200 thus is able to synthesize the background image to the parallax image string data to morph the resulting parallax image string.

The sequence of operations of selecting a background image from plural background images displayed on the rotary display 211, planar type display device planar type display device 212 or on the projection type display device 213 for setting the background image is explained with reference to FIG. 30. Since this processing is carried out in the above-described image pickup sequence, no description is made of the other operating sequences.

Figure 30:
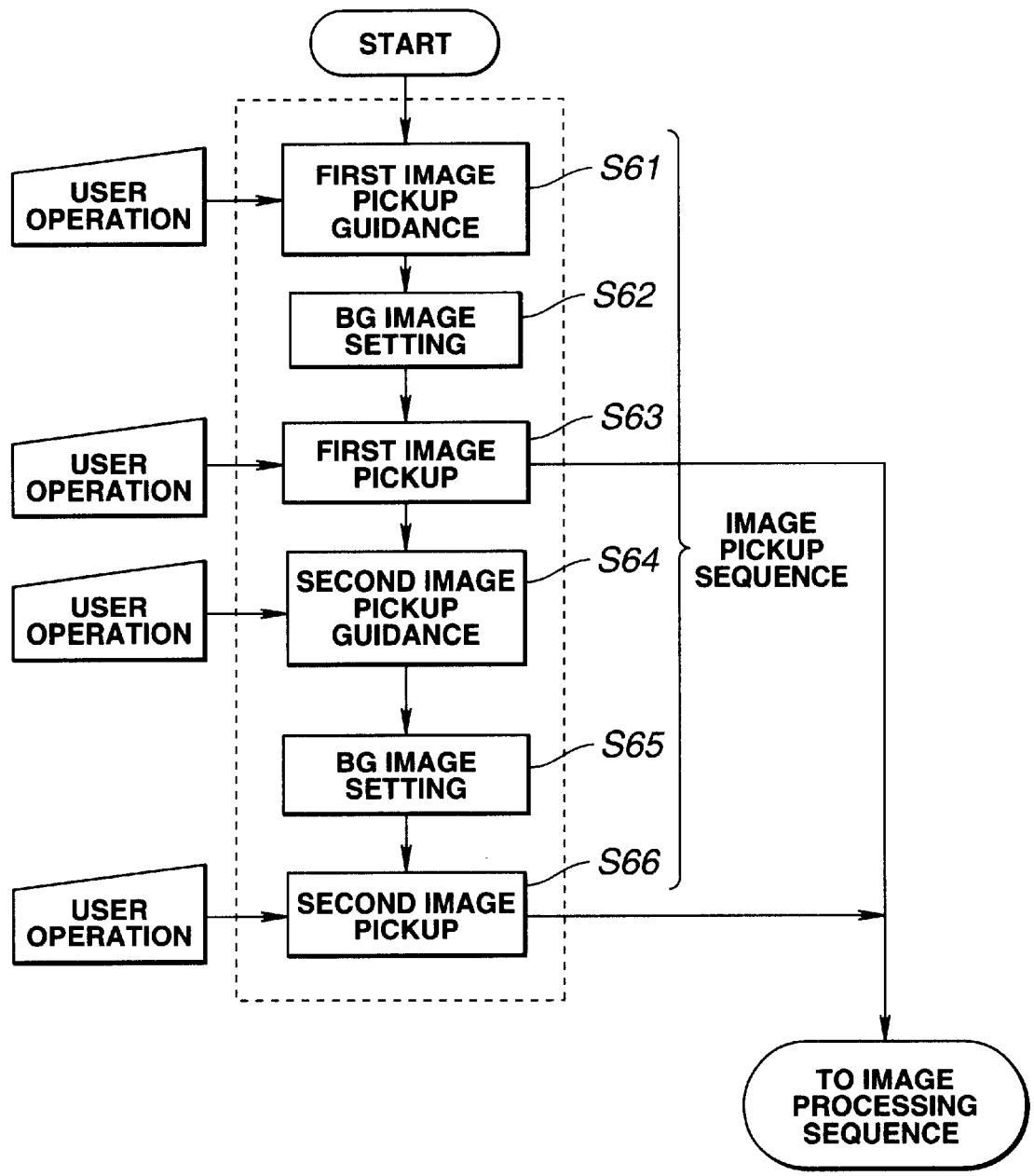
FIG. 30 illustrates a sequence of steps in the image printing device from setting of a background image in the image pickup sequence until transition to the image processing sequence.

Referring to FIG. 30, the image printing device 200 at step S61 displays or articulates the guidance for the first photographing on the display unit 40 and subsequently sets at step S62 an image displayed by the background unit 210 in accordance with the image previously selected in the guidance. The image pickup device 30 performs first photographing at step S63 as it acquired approval by the image pickup device 30. The parallax image string data, comprised of the image displayed on the background portion 210 and the object, is processed with characteristic pint extraction in the image processing sequence.

After performing the guidance for second imaging at step S64, the image printing device 200 sets at step S65 an image displayed by the background portion 210 in accordance with the pre-selected image. The image printing device 200 performs the second photographing at step S66, as it acquires the approval from the user. The parallax image string data, thus produced, is subjected to pre-set image processing in the image processing sequence.

The image printing device 200 optionally sets the background image to image the object.

The image printing device of the preferred embodiment, as described above, is able to formulate a three-dimensional image from the morphed parallax image string and hence is extremely rich in amusement furnishing properties.

The present invention is, however, not limited to the above-described embodiment, and may, for example, be combined with the above-described two embodiments or otherwise modified within the scope of the invention.

In the above-described image printing device, an object is imaged twice to produce two sets of the parallax image strings which then are morphed as described above. However, the object may be imaged thrice or more. Alternatively, plural present inventions, such as pre-stored parallax image strings, may be morphed, without performing imaging operations.

In the image printing device, the image processing sequences are carried out substantially in parallel with the image pickup sequence. The reason the processing proceeds in this manner is to achieve the expedited processing. If the processing is sufficiently fast, the image processing sequence, such as characteristic point extraction, may be started after termination of the totality of the image pickup sequence.

In the image printing device, the program rewriting sequence, the device operation confirmation sequence or the image communication sequence may be carried out simultaneous in parallel with the other operating sequences. These operating sequences may also be used in case of having communication with external equipments at a certain time period or with a request in the other operating sequence as a clue.

In the image printing device, an image frame or a background image is synthesized and the resulting parallax image string is morphed. Alternatively, the another image may be synthesized with the morphed parallax image string.

In the image printing device, the parallax imaging unit 32 is provided for photographing an image exhibiting parallax, and the CCD camera 31 is moved for this purpose. Alternatively, plural CCD cameras 31 may be provided and sequentially switched in parallel, simultaneously or sequentially to output image signals, instead of causing movement of the CCD camera.

What is claimed is:

1. An image printing device for formulating a three-dimensional image from a parallax image string made up of a plurality of parallax images obtained from a plurality of viewing points on the object, the image printing device comprising:

processing means for dividing each parallax image of the plurality of parallax images into a plurality of elementary areas;

interpolation means for interpolating shape changes between the elementary areas of the plurality parallax images to generate an interpolated parallax image string having a plurality of interpolated images, wherein said interpolated parallax image string includes the parallax information, and wherein interpolating shape changes includes multiplying a motion vector located between the parallax images by a plurality of rate of change values; and printing means for recording the plurality of interpolated images that make up the interpolated parallax image string on a recording medium for reproducing a three-dimensional image.

2. The image printing device according to claim 1 further comprising:

image pickup means for imaging the object a plurality of times each time from a different view points to generate a plurality of parallax image strings.

3. The image printing device according to claim 1 further comprising:

inputting means for inputting the information necessary for interpolating shape changes in said interpolation means; and display means for displaying an image, wherein said inputting means being capable of inputting analog quantities;

said interpolation means being capable of generating a plurality of sets of parallax image strings the degree of interpolation of which has been changed, and said display means demonstrating interpolated images obtained by changing the degree of interpolation of shape changes between the images making up the parallax image string responsive to the input information from said inputting means.

4. The image printing device according to claim 1 further comprising:

imaging means for imaging an object; and storage means having stored therein a parallax image string, wherein said interpolating means uses, as said plural sets of the parallax image strings from which said interpolated parallax image string is to be derived, a parallax image string made up of a plurality of parallax images, obtained on imaging said object from a plurality of different viewing points by said image pickup means, and a parallax image string stored in said storage means.

5. The image printing device according to claim 4 further comprising:

display means for displaying an image, wherein said display means displaying an interpolated image obtained by interpolating shape changes between an image constituting a parallax image string obtained by imaging said object by said image pickup means from plurality of viewing points and an image constituting a parallax image string stored in said storage means.

6. The image printing device according to claim 1 further comprising:

communication means for having communication with external equipment, wherein said communication means performing at least one of receiving a parallax image string to be interpolated by said interpolation means or the interpolated parallax image string from said external equipment, and transmitting said parallax image string or the interpolated parallax image string generated by said interpolation means.

7. The image printing device according to claim 1 further comprising:

storage means for storing an image; and synthesizing means for synthesizing a parallax image string made up of the plurality of parallax images obtained from a plurality of viewing points on the object and an image stored in said storage means to generate a synthesized parallax image string;

said interpolation means using the synthesized parallax image string, as at least one of the plural sets of the parallax image strings, to generate the interpolated parallax image string.

8. The image printing device according to claim 7 further comprising:

image generating means for generating an image based on the information inputted from external equipment;

the image generated by said image generating means being stored in said storage means.

9. The image printing device according to claim 7 wherein said synthesizing means synthesizes an image based on color hue or luminance.

10. The image printing device according to claim 1 further comprising:

image pickup means for imaging an object; and display means for displaying an image, wherein at least one of the parallax image strings to be interpolated by said interpolating means is a parallax image string made up of a plurality of parallax images obtained from imaging said object by said image pickup means from a plurality of viewing points;

said displaying means displaying a photographing index image for guiding said object to its proper position prior to imaging of said object by said image pickup means.

11. The image printing device according to claim 1 further comprising:

background image display means for displaying an image which is to be the background of said object, wherein said background image displaying means causing changes in an image for display responsive to the information inputted from external equipment.

12. An image printing method for formulating three-dimensional image from a parallax image string made up of a plurality of parallax images obtained from a plurality of viewing points on the object, the method comprising:

dividing each parallax image of the plurality of parallax images into a plurality of elementary areas;

interpolating shape changes between the elementary areas of the parallax images to generate a plurality of interpolated images, wherein a motion vector between the parallax images is multiplied by a plurality of rate change values associated with the parallax images;

generating an interpolated parallax image string including the plurality of interpolated images, said interpolated parallax image string having the parallax information; and recording the plurality of interpolated images making up the interpolated parallax image string on a recording medium for reproducing a three-dimensional image.

13. The image printing method according to claim 12 further comprising:

imaging the object a plurality of times from respectively different viewing points of the object to generate a plurality of sets of parallax image strings each of which is made up of a plurality of parallax images.

14. The image printing method according to claim 12 further comprising:

generating a plurality of sets of interpolated parallax image strings having a plurality of interpolated parallax images, the wherein a degree of interpolation is changed; and displaying the plurality of interpolated parallax images obtained by changing the degree of interpolation of shape changes between the plurality of parallax images is based on information input from external equipment.

15. The image printing method according to claim 12, wherein interpolated parallax images having a parallax image string of a plurality of parallax images obtained by photographing said object from a plurality of viewing points and a parallax image string stored in said storage means are used to generate the plurality of interpolated parallax image strings.

16. The image printing method according to claim 15 further comprising:

displaying an interpolated image obtained by interpolating shape changes between an image making up a parallax image string obtained by imaging said object from a plurality of viewing points and a parallax image string stored in said storage means.

17. The image printing method according to claim 12 further comprising:

performing at least one of receiving a parallax image string to be interpolated from an external equipment or said interpolated parallax image string and transmitting said parallax image string or said interpolated parallax image string to external equipment.

18. The image printing method according to claim 12 further comprising:

synthesizing a parallax image string including a plurality of parallax images obtained from a plurality of viewing points on the object with an image stored in said storage means to generate a synthesized parallax image string; and using said synthesized parallax image string as at least one of said plurality of parallax image strings from which said interpolated parallax image string is derived.

19. The image printing method according to claim 18 further comprising:

storing an image generated based on the externally inputted information in said storage means.

20. The image printing method according to claim 18 further comprising:

performing image synthesis based on color hue or luminance.

21. The image printing method according to claim 12 wherein at least one of said parallax image strings for interpolation is a parallax image string made up of a plurality of parallax images obtained by imaging the object from a plurality of viewing points; and wherein a photographing index image for guiding the object to its proper position is displayed on said display means prior to imaging said object.

22. The image printing method according to claim 12 wherein an image that is to be the background of said object is displayed on background image displaying means and wherein an image displayed on said background image displaying means is changed responsive to an input image inputted from external equipment.

* * * * *